US012287292B2

(12) United States Patent
Liao et al.

(10) Patent No.: US 12,287,292 B2
(45) Date of Patent: Apr. 29, 2025

(54) METHOD FOR DETECTING ANALYTE

(71) Applicant: National Cheng Kung University, Tainan (TW)

(72) Inventors: Jiunn-Der Liao, Tainan (TW); Han Lee, Tainan (TW); Kuan-Hung Liu, Tainan (TW)

(73) Assignee: National Cheng Kung University, Tainan (TW)

( * ) Notice: Subject to any disclaimer, the term of this patent is extended or adjusted under 35 U.S.C. 154(b) by 132 days.

(21) Appl. No.: 18/331,513

(22) Filed: Jun. 8, 2023

(65) Prior Publication Data
US 2023/0408414 A1 Dec. 21, 2023

Related U.S. Application Data

(60) Provisional application No. 63/350,460, filed on Jun. 9, 2022.

(51) Int. Cl.
*G01N 21/65* (2006.01)
(52) U.S. Cl.
CPC ................ *G01N 21/658* (2013.01)
(58) Field of Classification Search
CPC ........ G01N 21/658; B01D 39/16; B32B 5/24; B82Y 40/00; B82Y 30/00; D01D 5/00; C12Q 1/68; D04H 1/4382; D04H 1/728; D04H 3/016; D04H 3/16; D04H 5/06; D06M 11/83
See application file for complete search history.

(56) References Cited

U.S. PATENT DOCUMENTS

2023/0035300 A1 2/2023 Liao et al.

FOREIGN PATENT DOCUMENTS

CN 107012684 A * 8/2017 ............. D04H 1/728

OTHER PUBLICATIONS

6. Wang, Yanling, et al. "Template-confined site-specific electrodeposition of nanoparticle cluster-in-bowl arrays as surface enhanced Raman spectroscopy substrates." ACS Sensors 3.11 (2018): 2343-2350 (Year: 2018).*
Han Lee, Jiunn-Der Liao, Kundan Sivashanmugan, Bernard Haochih Liu, Wei-En Fu, Chih-Chien Chen, Guo Dung Chen and Yung-Der Juang, Gold Nanoparticle-Coated ZrO2-Nanofiber Surface as a SERS-Active Substrate for Trace Detection of Pesticide Residue, Nanomaterials 2018, 8, 402.

* cited by examiner

*Primary Examiner* — Tarifur R Chowdhury
*Assistant Examiner* — Roberto Fabian, Jr.
(74) *Attorney, Agent, or Firm* — BACON&THOMAS, PLLC

(57) ABSTRACT

A method for detecting an analyte comprises the following steps: providing a SERS-active substrate and a Raman spectra database; applying a sample onto the SERS-active substrate; applying an incident light by a Raman spectrometer onto the SERS-active substrate to generate a Raman spectrum of the sample; and comparing the Raman spectrum of the sample with a Raman spectra database to identify an analyte in the sample. The SERS-active substrate comprises: a support; a first dielectric layer disposed on the support, wherein the first dielectric layer is formed by a plurality of first nanofibers; and a plurality of noble metal particles formed on the plurality of first nanofibers.

17 Claims, 15 Drawing Sheets

METHOD FOR DETECTING ANALYTE

CROSS-REFERENCE TO RELATED APPLICATIONS

This application claims the benefit of filing date of U.S. Provisional Application Ser. No. 63/350,460, filed Jun. 9, 2022 under 35 USC § 119(e)(1).

BACKGROUND OF THE INVENTION

Field

The present invention relates to a method for detecting an analyte. More specifically, the present invention relates to a method for detecting an analyte using the surface-enhanced Raman scattering (SERS) technology.

Description of Related Art

Surface-enhanced Raman spectroscopy (SERS) technology has shown significant progress and is often used as a suitable method for trace-level detection of target analytes such as toxicants, environmental pollutants, pesticide residues, biological substances, pathogen, etc. There are roughly two approaches to achieve high sensitivity and accurate detection.

Labeling techniques are usually based on the use of reactive labeling reagents that irreversibly bind to specific functional groups on the target analyte and enable detection of the labeled chemical. For example, toxic or pesticide residues in food and the environment have been widely criticized as posing health risks to consumers and the atmosphere. However, trace analysis of the target species in samples is a challenge, as not all analytes are Raman-active and therefore cannot be detected directly by SERS, and further developments in the technology have brought labelling, e.g., with Raman-active reporters to meet this challenge. The selection of Raman reporters is often based on several factors, including their affinity for base metal components and their stability under harsh conditions. However, most of the SERS sensors require functionalizing the detector probe with antibodies specific to a virus, making them unsuitable for identifying other kinds of viruses or mutants. Moreover, knowledge about predefined labels required for the design of such sensors is a huge disadvantage for the surveillance of new emerging viruses.

The other is a label-free method, usually based on a substrate design, which uses a Raman laser of a selected wavelength to generate a hotspot(s) on the substrate to allow spectral analysis of the characteristic peaks of the analyte of interest.

As SERS-active substrates are used in applications such as trace detection and biosensing, several issues are suggested to be addressed, including sensitivity, intensity-concentration dependence, and selectivity. Thus, it is desirable to provide a novel detecting method using a novel SERS-active substrate.

SUMMARY OF THE INVENTION

An object of the present invention is to provide a novel SERS-active substrate and a method for detecting an analyte using the same, which can be applied to detect large or small analytes by using the SERS technology.

The SERS-active substrate of the present invention comprises: a support; a first dielectric layer disposed on the support, wherein the first dielectric layer is formed by a plurality of first nanofibers; and a plurality of noble metal particles formed on the plurality of first nanofibers.

The SERS-active substrate of the present invention has the first dielectric layer formed by the first nanofibers, and the first nanofibers can form the first grids. When a sample comprising an analyte is applied onto the SERS-active substrate, the analyte may be trapped in the holes of the first grids or on the first grids. In addition, the SERS-active substrate of the present invention shows relatively stronger peak intensities and contributes more unique SERS peaks assigned to the variants compared with the conventional SERS-active substrate. Thus, the detection efficiency using the SERS-active substrate of the present invention can be improved.

In one embodiment of the present invention, the material of the support is not particularly limited, and may include, for example, quartz, glass, silicon wafer, sapphire, polycarbonate (PC), polyimide (PI), polypropylene (PP), polyethylene terephthalate (PET) or other plastic or polymer material, or a combination thereof, but the present invention is not limited thereto.

In one embodiment of the present invention, the plurality of first nanofibers form a plurality of first grids, and the plurality of first grids respectively may have a hole size ranging from 250 nm to 1200 nm, for example, from 250 nm to 1100 nm, from 280 nm to 1100 nm, from 280 nm to 1000 nm or from 300 nm to 1000 nm. However, the present invention is not limited thereto, and the hole size of the first grids may be adjusted according to the needs.

In one embodiment of the present invention, 40% to 70% of a surface of the support may be covered by the first nanofibers, in other words, the coverage rate of the first nanofibers on the support may be 40% to 70%. In one embodiment of the present invention, the coverage rate may be, for example, 45% to 70%, 45% to 65%, 50% to 65%, 50% to 60% or 55% to 60%. However, the present invention is not limited thereto, and the coverage rate may be adjusted according to the needs.

In one embodiment of the present invention, the SERS-active substrate may further comprise a second dielectric layer disposed on the first dielectric layer, and the second dielectric layer is formed by a plurality of second nanofibers. Herein, the second nanofibers form a plurality of second grids. In addition, the noble metal particles are further formed on the second nanofibers.

In one embodiment of the present invention, the plurality of second grids respectively may have a hole size ranging from 100 nm to 500 nm, for example, 100 nm to 450 nm, 130 nm to 450 nm, 130 nm to 400 nm, 150 nm to 400 nm or 150 nm to 350 nm. However, the present invention is not limited thereto, and the hole size of the second grids may be adjusted according to the needs.

In one embodiment of the present invention, 70% to 90% of a surface of the support may be covered by the second nanofibers, in other words, the coverage rate of the second nanofibers on the support may be 70% to 90%. In one embodiment of the present invention, the coverage rate may be, for example, 75% to 90%, 75% to 85% or 80% to 85%. However, the present invention is not limited thereto, and the coverage rate may be adjusted according to the needs.

In one embodiment of the present invention, a hole size of one of the plurality of second grids is less than a hole size of one of the plurality of first grids. The first dielectric layer comprising the first nanofibers is closer to the support compared to the second dielectric layer comprising the second nanofibers. When the target analyte has a larger particle size (for example, viruses or proteins), the target analyte may be trapped in the hole of the second grids or on the second grids, and the unwanted molecules with smaller particle size (for example, chemical molecules) may pass through the hole of the second grids of the second dielectric layer. Thus, the detection efficiency can be improved by reducing (or filtering) unwanted molecules in the resulting SERS signals.

In one embodiment of the present invention, the SERS-active substrate may further comprise another dielectric layer(s) comprising nanofibers on the second dielectric layer, as long as the hole sizes of the grids are decreased from the support layer to the outmost dielectric layer away from the support layer. In addition, the number of the dielectric layers (including the first dielectric layer and the second dielectric layer) may be less than or equal to 5, for example, less than or equal to 3. For example, when the target analyte with the particle size of more than 50 sim, 2 or more dielectric layers (including the first dielectric layer and the second dielectric layer) may be comprised in the SERS-active substrate. Herein, the features of the dielectric layer(s) are similar to the features of the first dielectric layer and the second dielectric layer, and are not described again.

In one embodiment of the present invention, the material of the first nanofibers, the second nanofibers or other nanofibers may be a ceramic material. For example, the material of the first nanofibers, the second nanofibers or other nanofibers may be a high-k ceramic material having a dielectric constant (k) ranging from 3.9 to 30. Specific examples of the high-k ceramic material include $ZrO_2$, $TiO_2$, $HfO_2$, $Al_2O_3$ or a combination thereof, but the present invention is not limited thereto.

In one embodiment of the present invention, a thickness of the first dielectric layer may range from 20 nm to 100 nm, for example, 20 nm to 90 nm, 25 nm to 90 nm, 25 nm to 80 nm, 30 nm to 80 nm or 30 nm to 70 nm. However, the present invention is not limited thereto, and the thickness of the first dielectric layer may be adjusted according to the needs.

In one embodiment of the present invention, a sum of a thickness of the first dielectric layer and a thickness of the second dielectric layer may range from 50 nm to 150 nm, for example, 50 nm to 140 nm, 55 nm to 140 nm, 55 nm to 130 nm, 60 nm to 130 nm, 60 nm to 120 nm, 65 nm to 120 nm, 65 nm to 110 nm or 70 nm to 110 nm. However, the present invention is not limited thereto, and the sum of the thicknesses of the first and second dielectric layers may be adjusted according to the needs.

In one embodiment of the present invention, a metal of the noble metal particles may be Au, Ag or an alloy thereof. In one embodiment of the present invention, the metal of the noble metal particles may be Au.

In one embodiment of the present invention, the noble metal particles may respectively have a diameter ranging from 0.5 nm to 50 nm, for example, 1 nm to 50 nm, 1 nm to 45 nm, 5 nm to 45 nm, 10 nm to 45 nm, 15 nm to 45 nm, 20 nm to 45 nm or 20 nm to 40 nm. However, the present invention is not limited thereto, and the diameter of the noble metal particles may be adjusted according to the needs.

The present invention also provides a method for detecting an analyte, which comprises the following steps: providing the aforesaid SERS-active substrate and a Raman spectra database; applying a sample onto the SERS-active substrate; applying an incident light by a Raman spectrometer onto the SERS-active substrate to generate a Raman spectrum of the sample; and comparing the Raman spectrum of the sample with a Raman spectra database to identify an analyte in the sample.

In one embodiment of the present invention, the wavelength of the incident light provided by the Raman spectrometer can be adjusted according to the hole size of the grids, or the target analyte (for example, the size and the kind of the analyte) to be detected. Thus, the optimized signal of the SERS effect can be obtained. In addition, the power of the incident light provided by the Raman spectrometer may range from 0.3 mW to 40 mW, for example, 0.3 mW to 30 mW, 0.3 mW to 20 mW, 0.5 mW to 20 mW, 0.5 mW to 15 mW, 1 mW to 15 mW, 1 mW to 10 mW, 1.5 mW to 10 mW, 1.5 mW to 5 mW, 1.5 mW to 4.5 mW, 2 mW to 4.5 mW, 2.5 mW to 4.5 mW, 2.5 mW to 4 mW or 3 mW to 4 mW. However, the present invention is not limited thereto, and the power of the incident light may be adjusted according to the analyte to be detected.

In one embodiment of the present invention, the analyte to be detected may include, for example, small molecules such as chemical compounds, pesticides or toxins, virus such as flu virus, adenovirus or SARS-CoV-2 virus, peptides/proteins such as exosomes or metabolic wastes, or toxicants. However, the present invention is not limited thereto.

Other novel features of the invention will become more apparent from the following detailed description when taken in conjunction with the accompanying drawings.

DETAILED DESCRIPTION OF THE INVENTION

Figure 1A:
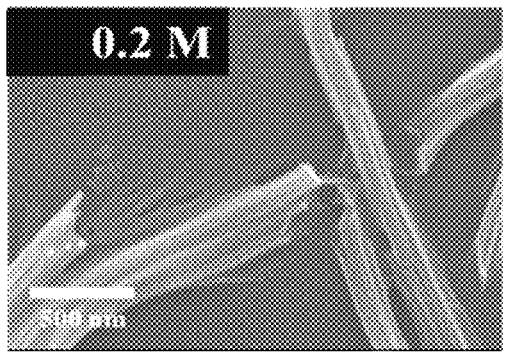
FIG. 1A to FIG. 1D show SEM photos of nanofibers prepared by the precursor solution with different concentrations according to Embodiment 1 of the present invention.

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not means that there is essentially a level, a rank, an executing order, or an manufacturing order among the elements, except otherwise specified. A "first" element and a "second" element may exist together in the same component, or alternatively, they may exist in different components, respectively. The existence of an element described by a greater ordinal number does not essentially means the existent of another element described by a smaller ordinal number.

Moreover, in the present specification, the terms, such as "top", "bottom", "left", "right", "front", "back", or "middle", as well as the terms, such as "on", "above", "under", "below", or "between", are used to describe the relative positions among a plurality of elements, and the described relative positions may be interpreted to include their translation, rotation, or reflection.

Moreover, in the present specification, when an element is described to be arranged "on" another element, it does not essentially means that the elements contact the other element, except otherwise specified. Such interpretation is applied to other cases similar to the case of "on".

Moreover, in the present specification, the terms, such as "preferably" or "advantageously", are used to describe an optional or additional element or feature, and in other words, the element or the feature is not an essential element, and may be ignored in some embodiments.

Moreover, in the present specification, when an element is described to be "suitable for" or "adapted to" another element, the other element is an example or a reference helpful in imagination of properties or applications of the element, and the other element is not to be considered to form a part of a claimed subject matter; similarly, except otherwise specified; similarly, in the present specification, when an element is described to be "suitable for" or "adapted to" a configuration or an action, the description is made to focus on properties or applications of the element, and it does not essentially mean that the configuration has been set or the action has been performed, except otherwise specified.

Moreover, in the present specification, a value may be interpreted to cover a range within ±10% of the value, and in particular, a range within ±5% of the value, except otherwise specified; a range may be interpreted to be composed of a plurality of subranges defined by a smaller endpoint, a smaller quartile, a median, a greater quartile, and a greater endpoint, except otherwise specified.

Embodiment 1—Preparation of the SERS-Active Substrate with Single Dielectric Layer Zirconium tetrachloride ($ZrCl_4$, 98%, Acros Organics, Geel, Belgium) was used as the precursor for the synthesis of $ZrO_2$. The precursor solution was prepared by dissolving appropriate amounts of $ZrCl_4$ in 10 mL isopropanol (99.8%, Panreac AppliChem Barcelona, Spain). After aging for 24 hr, 100 µl of each precursor was spin-coated onto a silicon wafer at 5,000 rpm for 30 sec at the ambient temperature and relative humidity of 25° C. and 70%, respectively. Prior to coating, silicon wafers were pre-cleaned with hydrochloric acid (37%, Panreac AppliChem, Barcelona, Spain) and then ethanol (99.9%, Merck KGaA, Darmstadt, Germany) to remove the organic contaminants on the surface. The as-prepared samples were heated at 80° C. for 20 min to evaporate the solvent and then calcined at 600° C. for 3 hr in the air for densification. The as-prepared $ZrO_2$ nanofibers ($fZrO_2$) were coated with Au NPs using an electron beam evaporator (VT1—10CE, ULVAC Inc., Japan) with a thickness of 1.5 nm and a rate of 0.1 A/s under $7\times10^6$ torr. Au NPs in/on the $fZrO_2$ is denoted as Au NPs/$fZrO_2$.

Thus, the SERS-active substrate (i.e. Au NPs/$fZrO_2$) of the present embodiment is obtained, which comprises: a support (i.e. the silicon wafer); a first dielectric layer disposed on the support, wherein the first dielectric layer is formed by a plurality of first nanofibers (i.e. $fZrO_2$); and a plurality of noble metal particles formed on the plurality of first nanofibers (i.e. Au NPs).

Comparative Embodiment

The SERS-active substrate of the present comparative embodiment can be prepared by the methods disclosed in US2023035300A1. In the present comparative embodiment, Au NPs on concave porous $ZrO_2$ with a pore size of 250 nm were prepared, denoted as Au NPs/$pZrO_2$.

High-resolution images of Au NPs/$fZrO_2$ and Au NPs/$pZrO_2$ were taken using a high-resolution field emission scanning electron microscope (FE-SEM, JSM-7000, JEOL, Tokyo, Japan) operated at 10 kV accelerating voltage; all samples were platinum-coated. Surface topographies were acquired by atomic force microscope (AFM, Dimension Icon from Bruker, Karlsruhe, Germany) using dynamic mode (0.5 Hz scan rate).

The surface structures of Au NPs/$fZrO_2$ and Au NPs/$pZrO_2$ were analysed using an X-ray diffractometer (XRD, MiniFlex II, Rigaku, Japan) using CuK* radiation at scan angles ranging from 20° to 65° and compared the obtained XRD patterns with JCPDS cards 89-6976 and 65-1022.

FIG. 1A to FIG. 1D show SEM photos of nanofibers prepared by the precursor solution with different concentrations, wherein the nanofibers shown in FIG. 1A to FIG. 1D were respectively prepared by the precursor solution containing 0.2 M, 0.3 M, 0.4 M and 0.5 M of $ZrCl_4$. These results indicate that the dielectric layer comprising nanofibers with different sizes may be prepared by using the precursor solution with different concentrations. Hereinafter, Au NPs/$fZrO_2$ prepared by the precursor solution containing 0.3 M of $ZrCl_4$ was used in the following testing examples.

Figure 2:
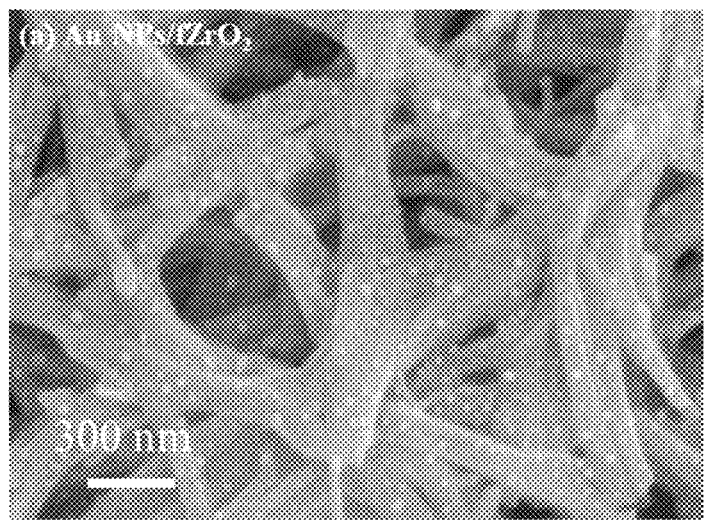
FIG. 2 shows a SEM photo of Au NPs/fZrO$_2$ according to Embodiment 1 of the present invention.
Figure 3:
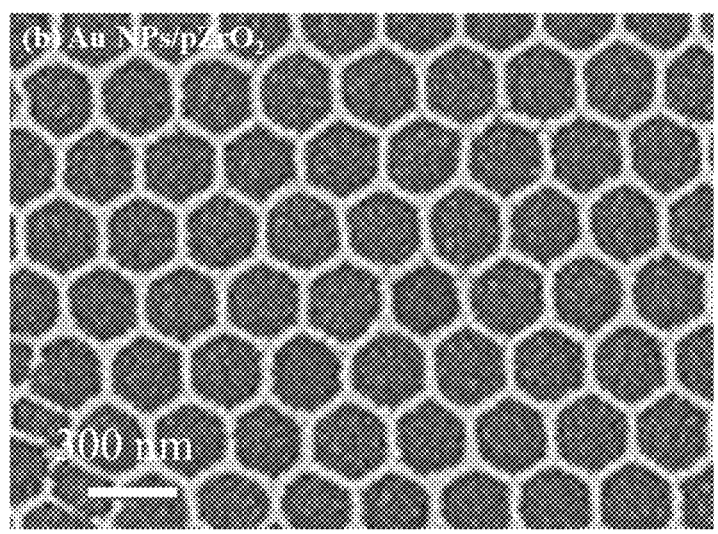
FIG. 3 shows a SEM photo of Au NPs/pZrO$_2$ according to Comparative embodiment of the present invention.

FIG. 2 shows a SEM photo of Au NPs/$fZrO_2$, wherein the nanofibers were prepared by the precursor solution containing 0.3 M of $ZrCl_4$. FIG. 3 shows a SEM photo of Au NPs/$pZrO_2$, wherein the pore size of the cavities is about 250 nm. These results indicate Au NPs/$fZrO_2$ of Embodiment 1 and Au NPs/$pZrO_2$ of Comparative embodiment were successfully prepared.

Embodiment 2—Preparation of the SERS-Active Substrate with Double Dielectric Layers The SERS-active substrate of the present embodiment is similar to that of Embodiment 1, except that the SERS-active substrate of the present embodiment comprises two dielectric layers.

More specifically, after forming the first dielectric layer, a second dielectric layer was formed by a plurality of second nanofibers, and then Au NPs were deposited on the second dielectric layer with the second nanofibers. Thus, compared to the SERS-active substrate of Embodiment 1, the SERS-active substrate of the present embodiment further comprises a second dielectric layer disposed on the first dielectric layer, the second dielectric layer is formed by a plurality of second nanofibers, and the plurality of noble metal particles are further formed on the plurality of second nanofibers.

Figure 4A:
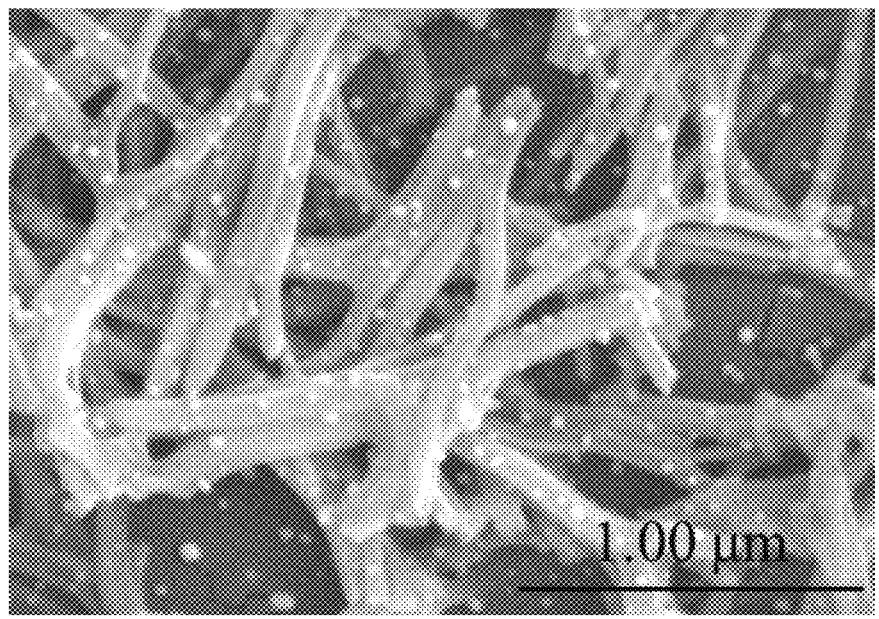
FIG. 4A and FIG. 4B shows SEM photos of Au NPs/fZrO$_2$ according to Embodiments 1 and 2 of the present invention.
Figure 4B:
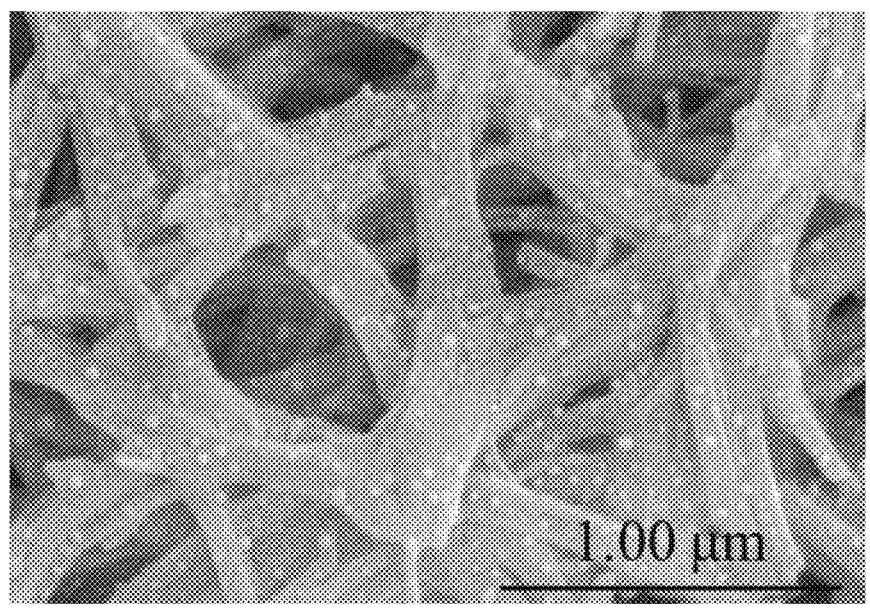

FIG. 4A and FIG. 4B shows SEM photos of Au NPs/fZrO$_2$ according to Embodiments 1 and 2 of the present invention. The first nanofibers shown in FIG. 4A were prepared by the precursor solution containing 0.3 M of ZrCl$_4$. The first nanofibers and the second nanofibers shown in FIG. 4B were prepared using precursor solutions that contained 0.3 M concentration of ZrCl$_4$.

In addition, the hole sizes of the first grids of the first nanofibers, the hole sizes of the second grids of the second nanofibers, the coverage rates of the first nanofibers and the second nanofibers, and the diameter of the Au NPs, were analysed from the SEM photos. In addition, the thickness of the dielectric layer(s) were also analysed from XRD analysis, wherein 2θ ranges from 200 to 80°. The results are shown in the following Table 1.

TABLE 1

|  | Embodiment 1 Single dielectric layer Au NPs/fZrO$_2$ | Embodiment 2 Double dielectric layers Au NPs/fZrO$_2$ |
| --- | --- | --- |
| Coverage rate | About 55~60% | About 80~85% |
| Hole size of the grids | 642 + 335 nm | 263 + 70 nm |
| Diameter of Au NPs (n = 100) | About 31 nm | About 29 nm |
| Thickness | 30~70 nm | 70~110 nm |

The results indicate that the coverage rate of the double dielectric layers (including the first and second dielectric layers) in Embodiment 2 is greater than the coverage rate of the single dielectric layer (i.e. the first dielectric layer) in Embodiment 1. In addition, the hole size of the first grid formed by the first nanofibers in Embodiment 1 is greater than the hole size of the second grid formed by the second nanofibers in Embodiment 2. Thus, the dielectric layers with different morphologies can be prepared according to the needs (for example, the particle sizes of the analytes).

Embodiment 3—Detection System

The SERS-active substrate of Embodiment 1 may be used with a Raman spectrometer to form a detection system. Herein, the Raman spectrometer can provide an incident laser onto the SERS-active substrate to obtain a Raman scattering signal, and then output a Raman spectrum.

The SERS-active substrates of Embodiment 1 and Comparative embodiment are used in the following testing examples. The detection system of Embodiment 3 is used in the following testing examples. The procedure for detecting an analyte comprises the following steps: providing a SERS-active substrate and a Raman spectra database; applying a sample onto the SERS-active substrate; applying an incident light by a Raman spectrometer onto the SERS-active substrate to generate a Raman spectrum of the sample; and comparing the Raman spectrum of the sample with a Raman spectra database to identify an analyte in the sample.

In the following examples, Laboratory Raman spectroscopy (lab RS, UniDRON, CL Technology Co. Ltd.), was performed using a laser spot of 2 mm in diameter, a spectral resolution of around 5 cm$^{-1}$, and a laser wavelength of 633 nm with a laser power of 3.5 mW (10%). The lab RS is used for the detection of molecular probe and pesticide residues. Portable Raman spectroscopy (portable RS, Benchtop-size Single Laser Micro Raman Spectroscopy, NS220, Nanoscope Systems, Inc., Korea) was used to acquire data from live SARS-CoV-2 virus and its variants. The portable RS was used in a biosafety level 3 laboratory (BSL-3, National Cheng Kung University hospital, Tainan, Taiwan) with a laser spot of 2 mm in diameter, a spectral resolution of around 10 cm$^{-1}$, a laser wavelength of 633 f 1 nm, and a laser power of 4.0 mW (10%).

Within one Raman laser spot using the portable RS, around 36 complete nanostructures are contained in Au NPs/pZrO$_2$. Nine consecutive measurements of Au NPs/fZrO$_2$ or NPs/pZrO$_2$ with analyte were performed, with a center-to-center distance of around 2 mm in one measurement. Shallow wells in a plastic slide with a glass coverslip and two substrates containing a 5 mm×5 mm support were used. An analyte-containing solution of 10 mL was then placed on the substrate.

In addition, all Raman spectra were normalized using a peak fitting software, OriginPro, which was used to process the raw spectral data by subtracting the background. One spectrum ranging from 800 to 1800 cm$^{-1}$ was collected, followed by taking nine adjacent positions and averaged for all the analytes.

Testing Example 1—Analyte Sources: Pesticide Residues

To study the detection efficiency of Au NPs/fZrO$_2$ and Au NPs/pZrO$_2$ for small species, four pesticide molecules, namely cypermethrin, parathion, carbaryl, and phosmet (Sigma Aldrich, St. Louis, MO, USA), with and without organophosphorus species were used. Then 10 μL of each diluted pesticide solution of was applied to the substrate and left to dry at room temperature for further analysis. Note that ZrO$_2$ has a strong attraction to phosphoryl groups, which makes it easier for organophosphates to adhere to ZrO$_2$ surfaces. Therefore, four pesticide molecules with or without organophosphates were selected to compare the two substrates.

In addition, to evaluate the sensitivity of SERS measurements in detecting analytes, the LODs were respectively determined. Aqueous solutions of pesticide molecules at concentration ranges of $10^{-3}$ to $10^{-6}$ M were prepared.

Figure 5A:
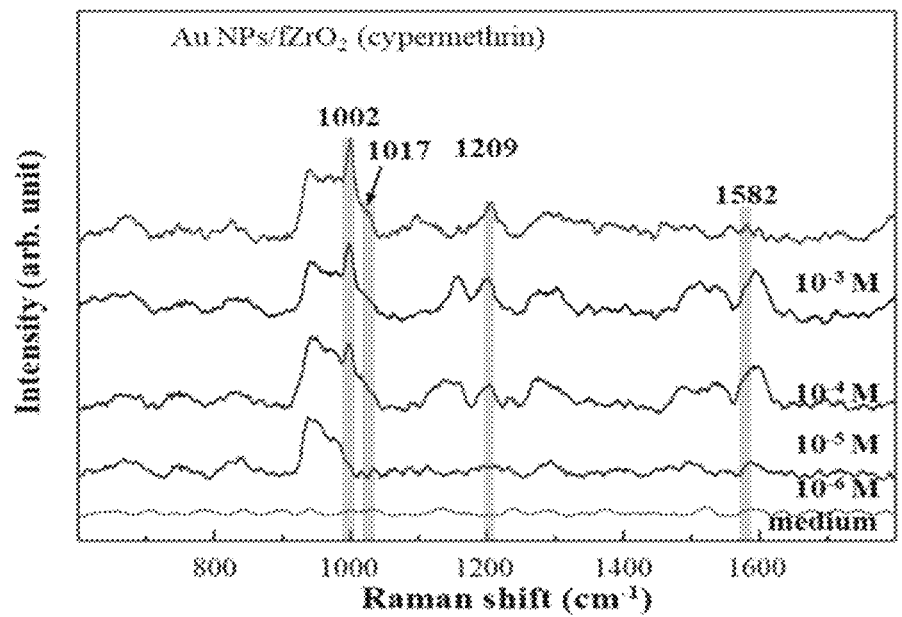
FIG. 5A to FIG. 5D show the testing results of Testing example 1.
Figure 5B:
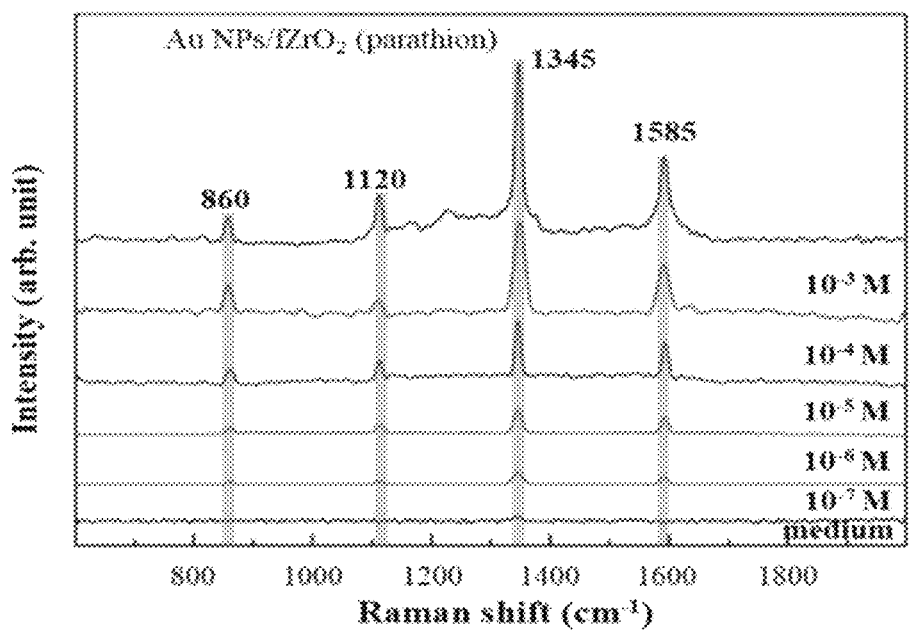
Figure 5C:
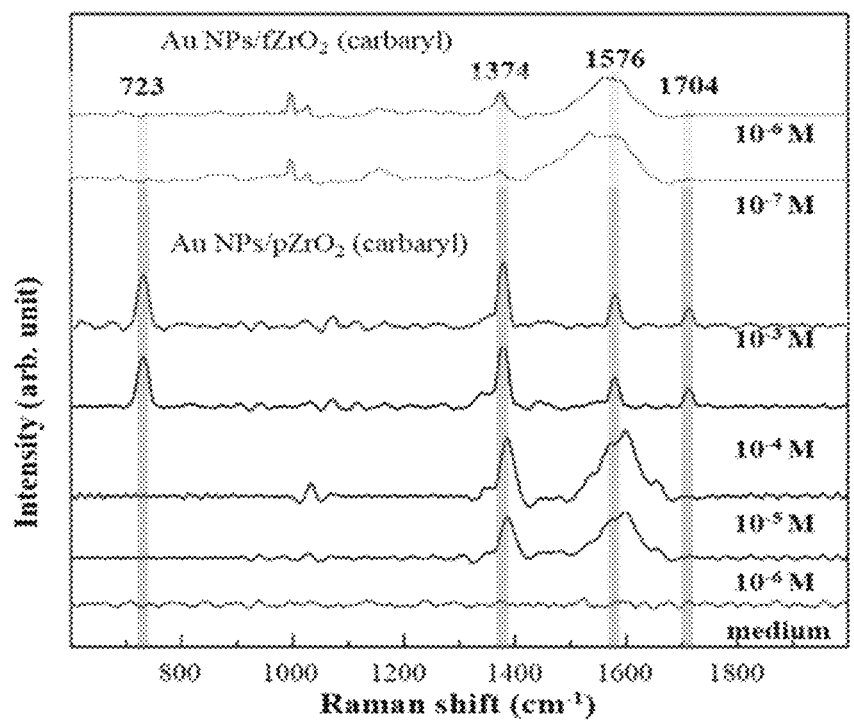
Figure 5D:
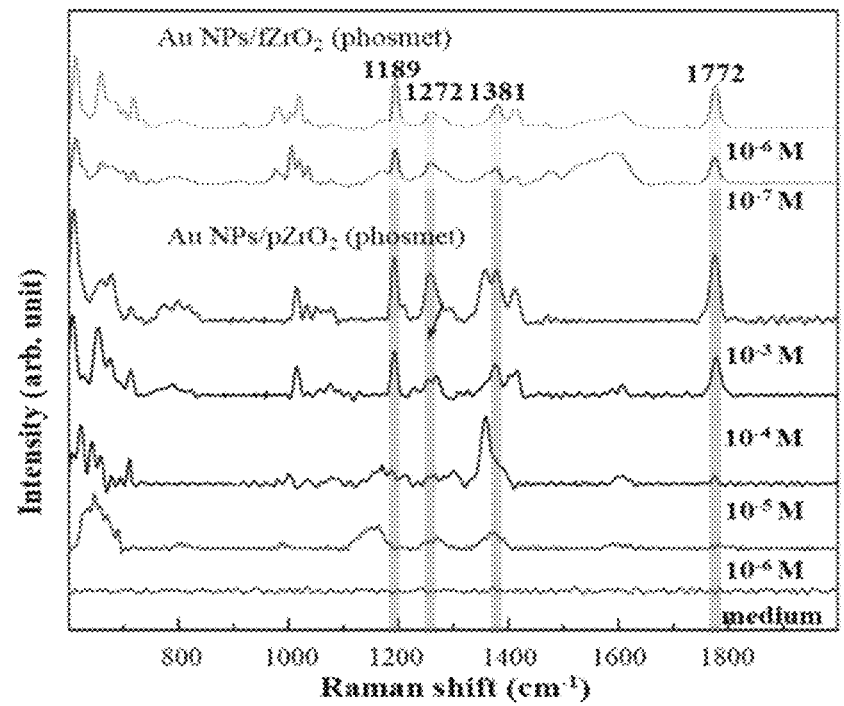

FIG. 5A to FIG. 5D show the testing results of the present testing example, wherein FIG. 5A shows the testing results of analysing cypermethrin, FIG. 5B shows the testing results of analysing parathion, FIG. 5C shows the testing results of analysing carbaryl, and FIG. 5D shows the testing results of analysing phosmet. In the present testing example, the pesticide molecules cypermethrin and carbaryl (without organophosphates) and parathion and phosmet (with organophosphates) were respectively tested in the concentration range of $10^{-3}$ to $10^{-6}$ M on Au NPs/fZrO$_2$ and Au NPs/pZrO$_2$, respectively.

As shown in FIG. 5A and FIG. 5B, the pesticides cypermethrin and parathion were tested on Au NPs/fZrO$_2$. Taking the concentration of $10^{-3}$ M as a reference, the characteristic peaks of cypermethrin are mainly located at 1002 (benzene ring breathing vibration), 1017 (ν(C—O)), 1209 (ν(C—O)), and 1582 (ν(C=C) ben) cm$^{-1}$ and those of parathion are mainly located at 860 (ν(P—O)), 1120 (ν(C—N)), 1345 (δ(C—O)), and 1585 (ν(phenyl)) cm$^{-1}$. Using the peaks at 1002 (cypermethrin) and 1345 (parathion) cm$^{-1}$ as indicators, the LOD of cypermethrin was estimated to be $10^{-6}$ M and that of parathion was estimated to be $10^{-7}$ M, which indicated Au NPs/fZrO$_2$ was capable of detecting trace amount of small pesticide molecules.

The pesticides carbaryl and phosmet were also tested on Au NPs/fZrO$_2$, and FIG. 5C and FIG. 5D show SERS spectra at low concentrations of $10^{-6}$ and $10^{-7}$ M. In addition, Au NPs/pZrO$_2$ in the testing concentration range from $10^{-3}$ to $10^{-6}$ M was used reference. Based on the concentration of $10^{-3}$ M, the characteristic peaks of carbaryl are mainly located at 723 ($\delta$(NCOC), in-plane deformation vibration), 1374 (symmetric ring vibration), 1576 ($\nu$(C=C), stretching in naphthalene ring), and 1704 (C=O stretching), and those of phosmet are mainly located at 1189 ($\delta$(C—N), in-plane deformation vibration), 1272 ($\nu$(C—N), stretching in S—CH$_2$—N), 1381 ($\delta$(CH$_3$), in-plane deformation vibration), and 1772 ($\nu$(C=O), stretching) cm$^{-1}$. Using the peaks at 1576 (carbaryl) and 1189 (phosmet) cm$^{-1}$ as indicators, the LODs of carbaryl and phosmet were estimated to be $10^{-6}$ M, which indicated that Au NPs/pZrO$_2$ and Au NPs/fZrO$_2$ were comparable in the LOD and capable of detecting trace amount of small pesticide molecules.

Testing Example 2—Analyte Sources: Live SARS-CoV-2 Alpha and Delta Variants

Live SARS-CoV-2 virus is classified as a Risk Group 3 (RG-3) agent and requires propagation by neutralization assays and virus culture in a BSL-3 laboratory. For this study, various early lineages of the SARS-CoV-2 virus, including B.1.1.7 (Alpha variant) and B.1.617.2 (Delta variant), were obtained from National Cheng Kung University Hospital in Taiwan. Nasopharyngeal and nasal swabs from patients diagnosed with the virus by reverse transcription-PCR (RT-PCR) were collected and inoculated into Vero E6 cells to culture the virus at 35° C. in medium containing 5% CO$_2$. Note that the quality of spike glycoprotein obtained from live virus may differ from that of isolated or inactivated spike glycoprotein. The cultured virus samples were stored at −80° C. after the genotype and variant identification through whole gene sequencing. The SERS spectra of live Alpha and Delta variants were also referred to our previous studies (Sitjar, J., Xu, H. Z., Liu, C. Y., Wang, J. R., Liao, J. Der, Tsai, H. P., Lee, H., Liu, B. H., & Chang, C. W. (2022). Synergistic surface-enhanced Raman scattering effect to distinguish live SARS-CoV-2 S pseudovirus. *Analytica Chimica Acta,* 1193; Sitjar, J., Liao, J. Der, Lee, H., Tsai, H. P., Wang, J. R., Chen, C. H., Wang, H., & Liu, B. H. (2023). Detection of live SARS-CoV-2 virus and its variants by specially designed SERS-active substrates and spectroscopic analyses. *Analytica Chimica Acta,* 1256.)

In addition, to evaluate the sensitivity of SERS measurements in detecting analytes, the LODs were respectively determined. The original virus concentration of $10^7$ copies/mL was diluted with medium to concentrations of $10^7$, $10^6$, $10^5$, and $10^4$ copies/mL. Noted that virus particles may exhibit different nucleic acid signatures depending on their state, such as live, denatured, inactivated, or fragmented, which may affect SERS spectrum. Nine SERS spectra were acquired from different locations on the substrate and averaged for one measurement. By taking the common SERS peaks for Alpha and Delta variants at a concentration of $10^7$ copies/mL, the LODs were determined.

FIG. 6A to FIG. 6D show the testing results of the present testing example, wherein Raman spectra of live SARS-CoV-2 virus, Alpha and Delta variants, are shown using Au NPs/fZrO$_2$ with Au NPs/pZrO$_2$ as reference. For one spectrum, nine different measurement positions on the substrate are averaged. The measured SERS peaks are specifically assigned to the spike protein of SARS-CoV-2 virus.

Figure 6A:
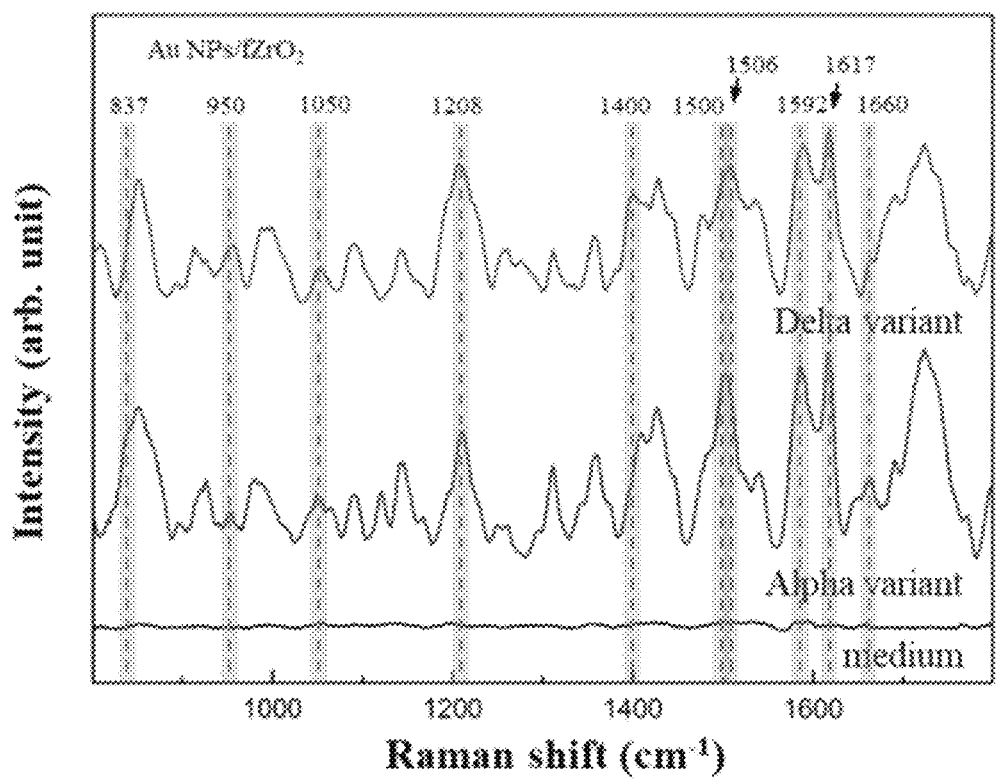
FIG. 6A to FIG. 7D show the testing results of Testing example 2.
Figure 6B:
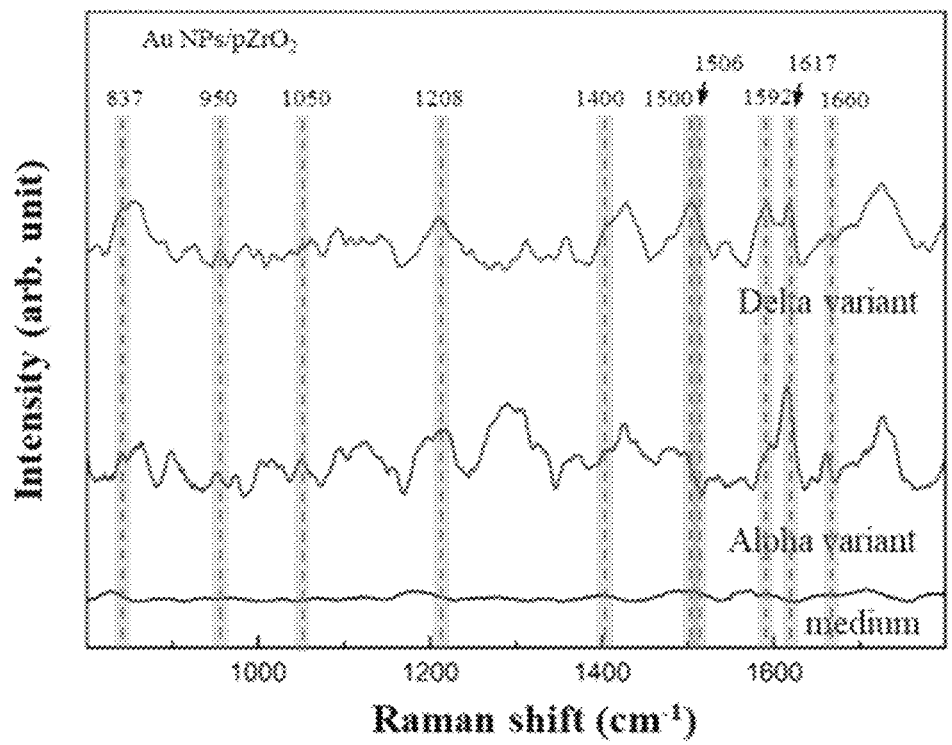

In FIG. 6A and FIG. 6B, Au NPs/fZrO$_2$ and Au NPs/pZrO$_2$ were used to detect Alpha and Delta variants; the ten common peaks marked in grey in the peak regions correspond to most peak assignments in the spike protein of live SARS-CoV-2 virus. Although the peak intensities are shown strongly when using Au NPs/fZrO$_2$, their presences relative to the peak positions are identical as for Au NPs/pZrO$_2$. Therefore, these ten peak positions can be used to identify the detection of live SARS-CoV-2 virus.

Figure 6C:
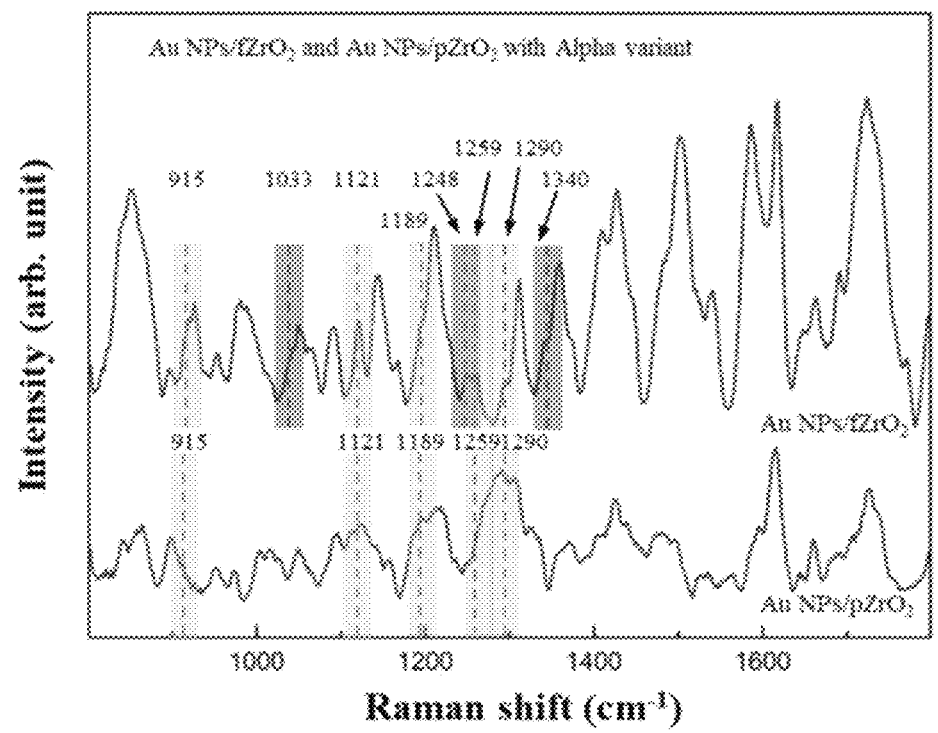

The detection performance of Au NPs/fZrO$_2$ relative to Au NPs/pZrO$_2$ was further investigated. In FIG. 6C of Alpha variant, the peaks at 915, 1121, 1189, 1259, and 1290 cm$^{-1}$ marked in light grey in the peak regions are the characteristic peaks of Alpha variant; the two substrates show similar ability. Importantly, the peaks at 1033, 1248, and 1340 cm$^{-1}$ marked in dark grey in the peak regions are only specific to the use of Au NPs/fZrO$_2$.

Figure 6D:
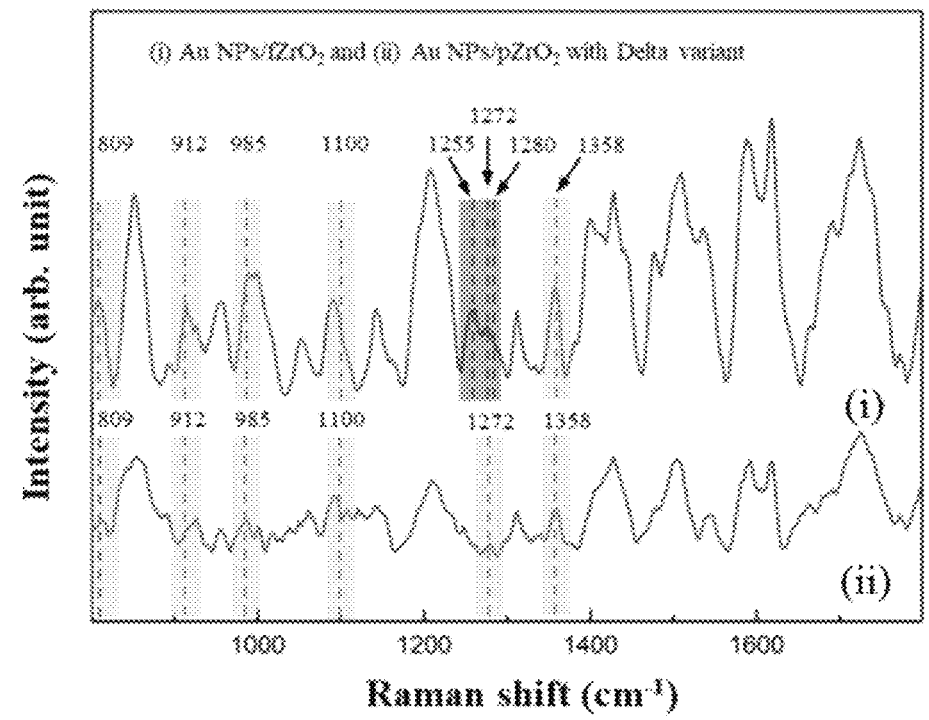

In FIG. 6D of Delta variant, the peaks at 809, 912, 985, 1100, 1272, and 1358 cm$^{-1}$ marked in light grey in the peak regions are the characteristic peaks of Delta variant; the two substrates also exhibit similar ability. Importantly, the peaks at 1255 and 1280 cm$^{-1}$ marked in dark grey in the peak regions are only specific to the use of Au NPs/fZrO$_2$.

FIG. 7A to FIG. 7D show the testing results of the present testing example, wherein the limit of detection (LOD) for Alpha and Delta variants are shown.

Figure 7A:
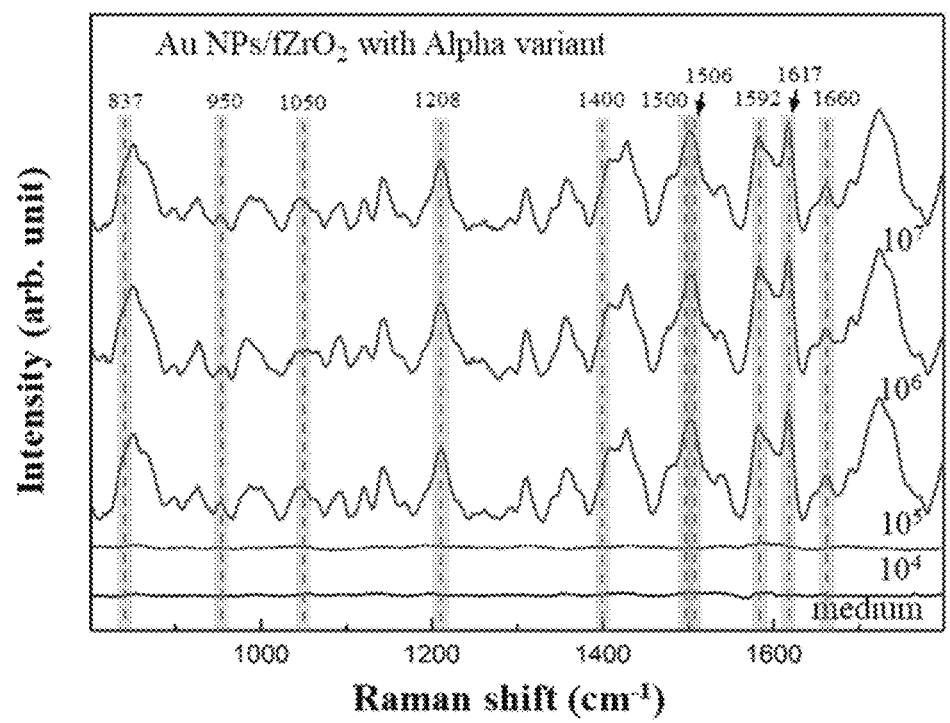
Figure 7B:
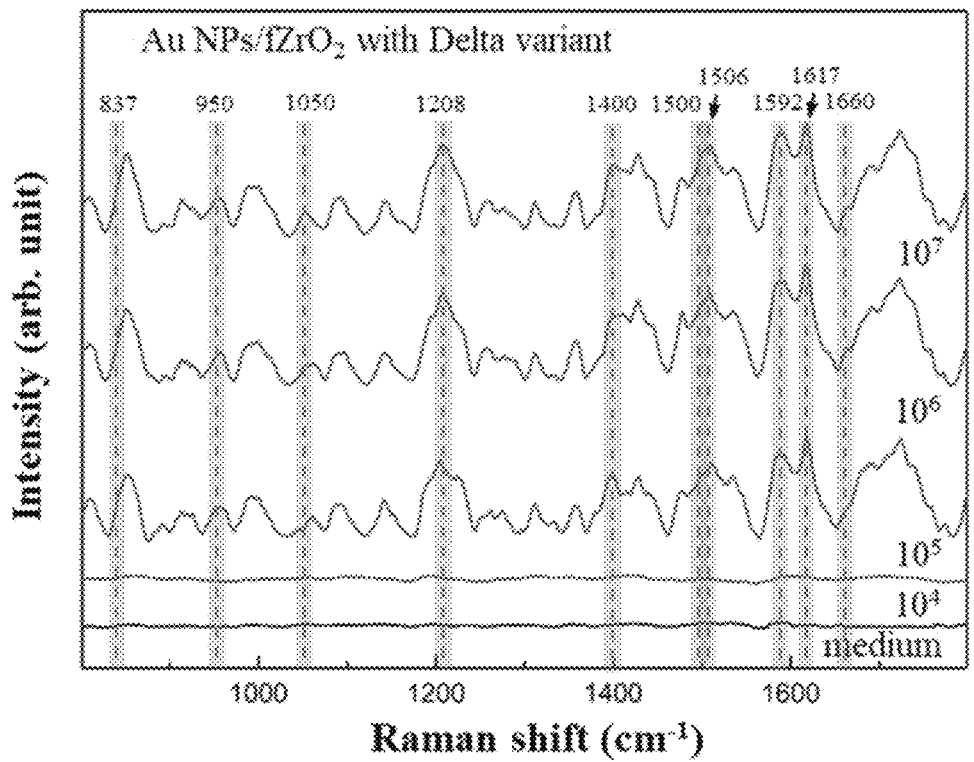
Figure 7C:
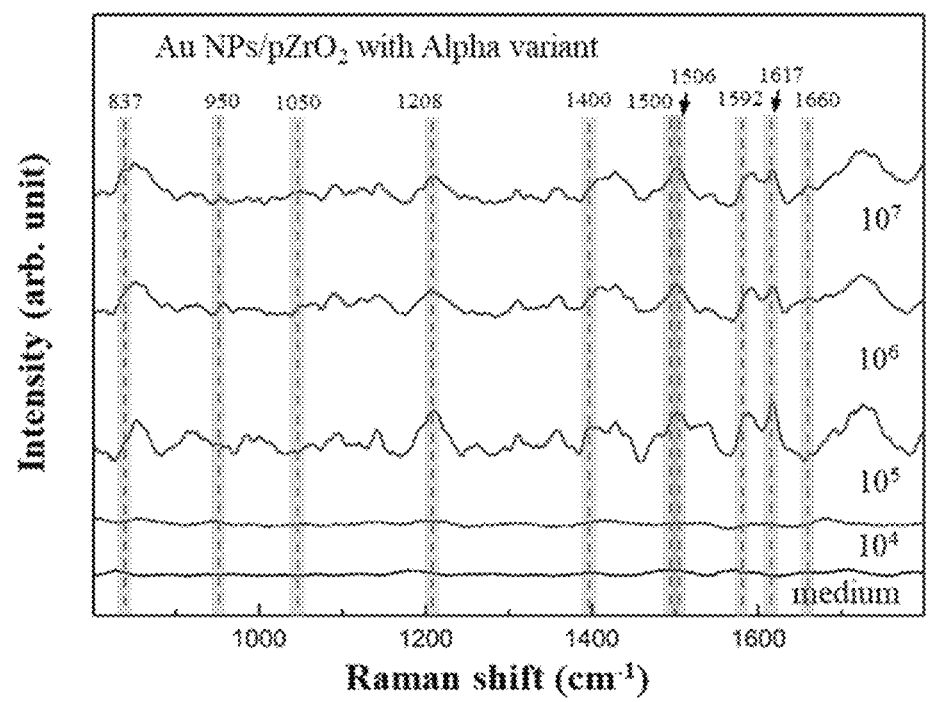
Figure 7D:
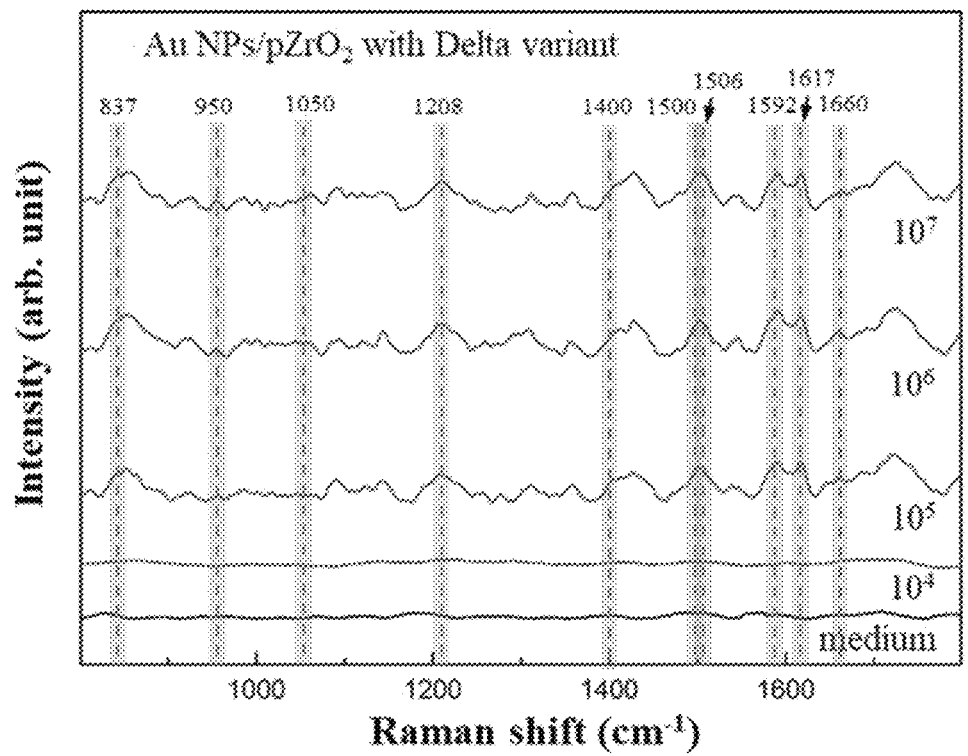

As shown in FIG. 7A and FIG. 7B, with the ten common peaks marked in grey in the peak regions as a reference, corresponding to the spike protein of live SARS-CoV-2 virus, the LODs of Alpha and Delta variants using Au NPs/fZrO$_2$ were clearly produced at a concentration of $10^5$ copies/mL, while similar LODs were obtained using Au NPs/pZrO$_2$, as shown in FIG. 7C and FIG. 7D. Both substrates showed similar ability to detect low concentrations of Alpha and Delta variants.

Although their LODs are comparable, the measured SERS intensities were different from the substrates used, namely fibrous and bowl-like structures. As shown in FIG. 7A and FIG. 7C, the measured SERS intensities using Au NPs/fZrO$_2$ is greater than that using Au NPs/pZrO$_2$. Similarly, as shown in FIG. 7B and FIG. 7D, the measured SERS intensities using Au NPs/fZrO$_2$ is greater than that using Au NPs/pZrO$_2$.

Testing Example 3—Analyte Sources: Live SARS-CoV-2 Alpha and Delta Variants with Interfering Substances Alpha and Delta variants of the LOD concentrations were prepared prior to studying the effect of adding interfering substances. Three interfering substances, oxymetazoline (Oxy), fluticasone furoate (Flu) and acetaminophen (Ace), were added to Alpha and Delta solutions at a concentration of 0.075 mg/ml, 55 µg/ml, and 20 mg/ml, respectively. They were then mixed and stored in test tubes for subsequent SERS measurements.

FIG. 8A to FIG. 8D show the testing results of the present testing example, wherein by indicating the ten common peaks marked in variant-specific peaks (at 837, 950, 1050, 1208, 1400, 1500, 1506, 1592, 1617 and 1660 cm$^{-1}$) in Alpha and Delta variants at the LOD level of $10^5$ copies/mL (marked (i) in the figures), the influences of three common interfering substances, namely (ii) Oxymetazoline (Oxy), (iii) Fluticasone (Flu), and (iv) Acetaminophen (Ace) were tested when detecting live Alpha and Delta variants.

Figure 8A:
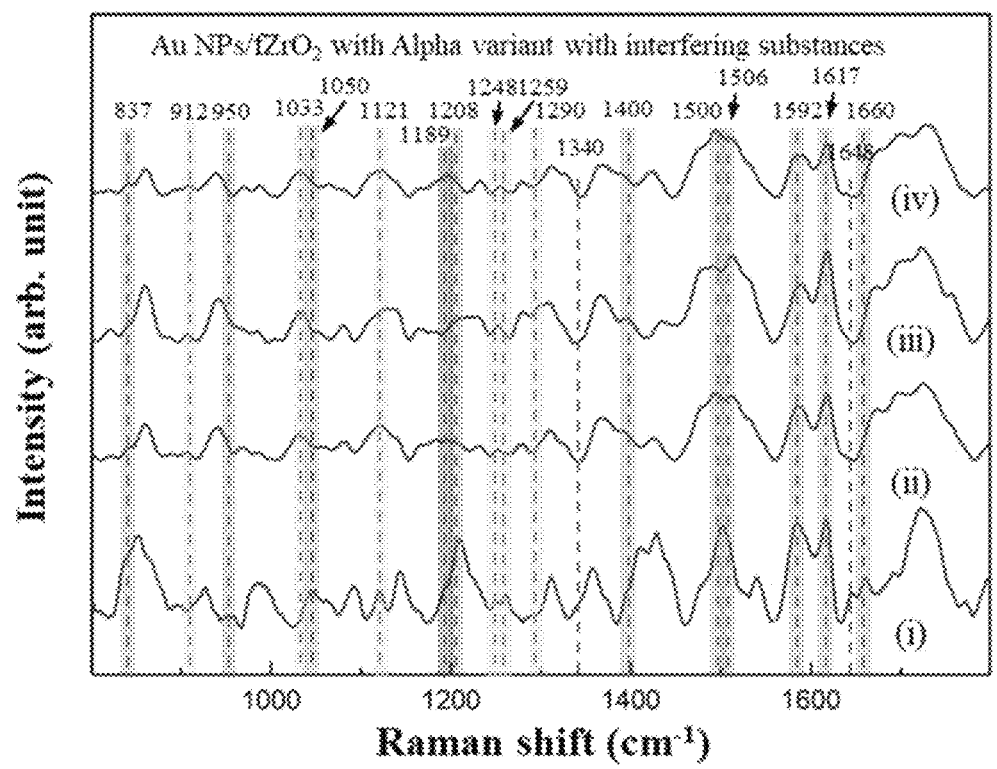
FIG. 8A to FIG. 8D show the testing results of Testing example 3.
Figure 8B:
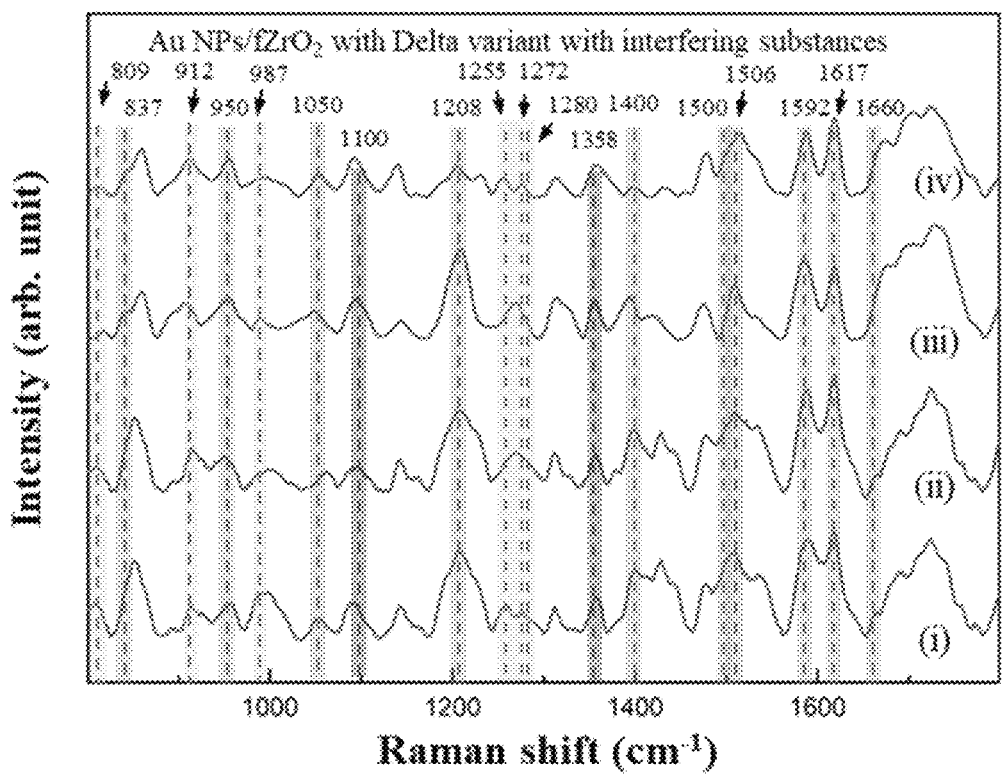
Figure 8C:
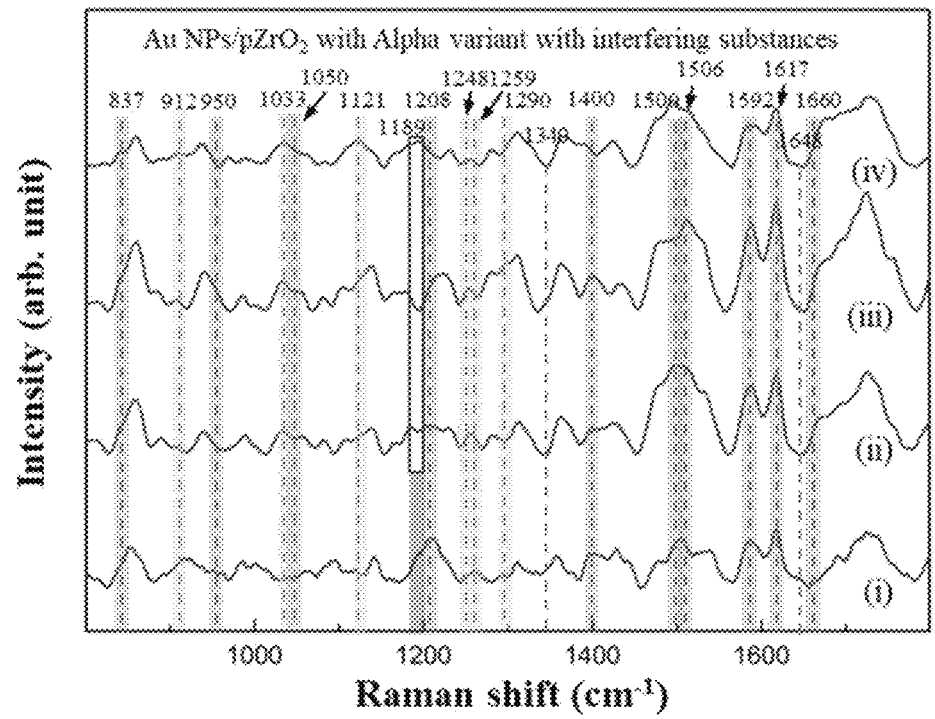
Figure 8D:
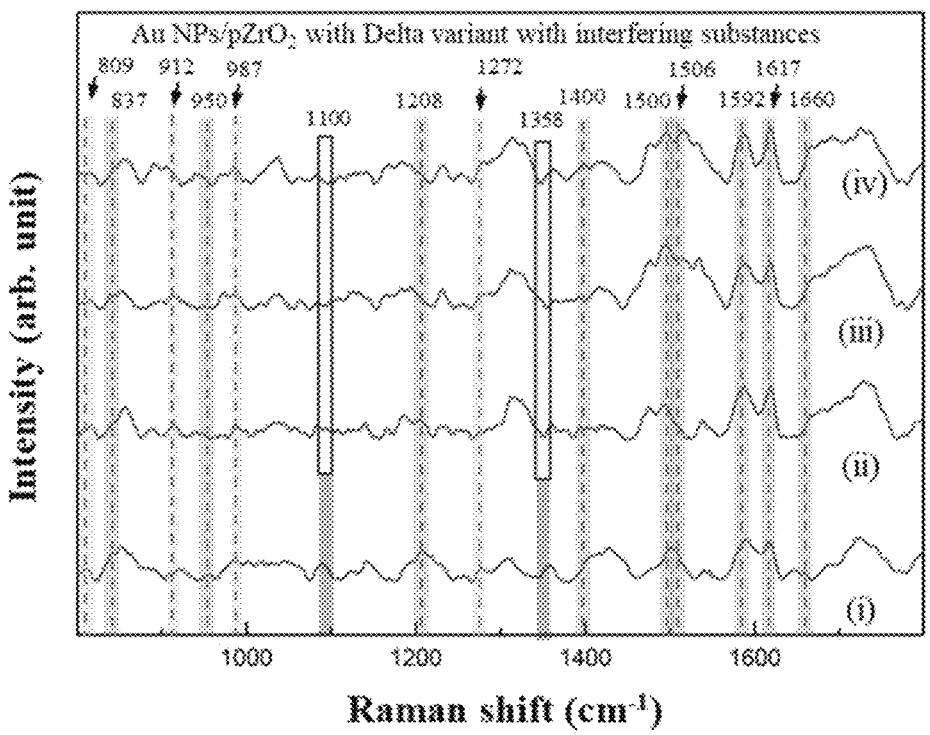
Figure 9A:
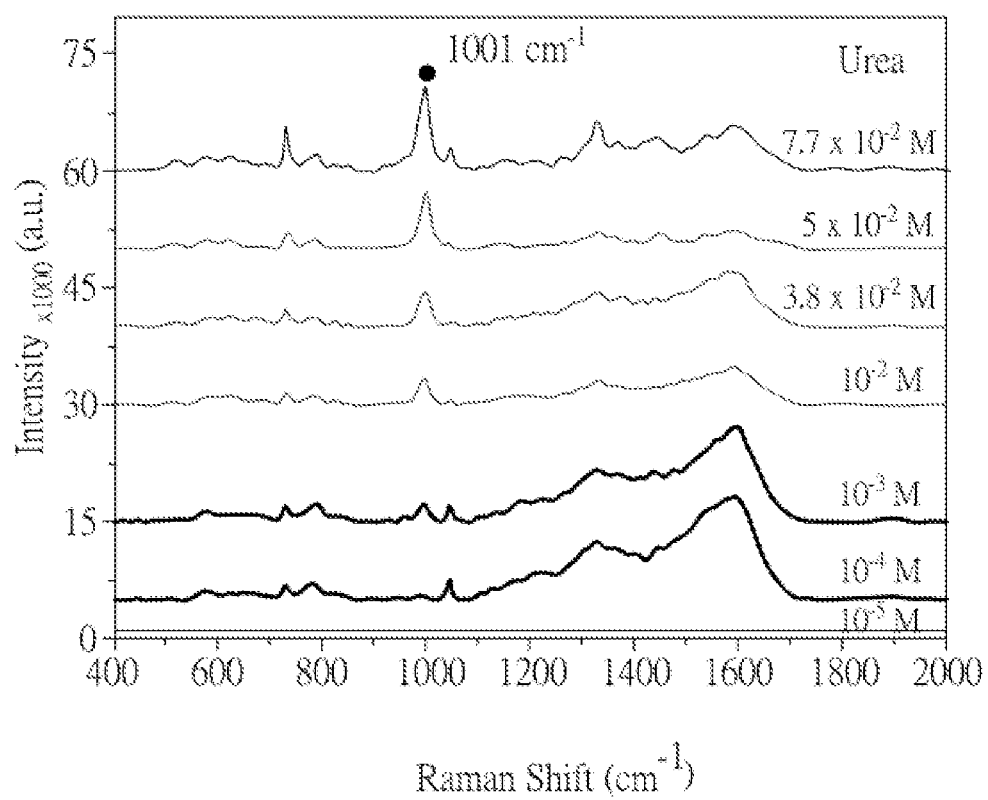
FIG. 9A to FIG. 9D show the testing results of Testing example 4.
Figure 9B:
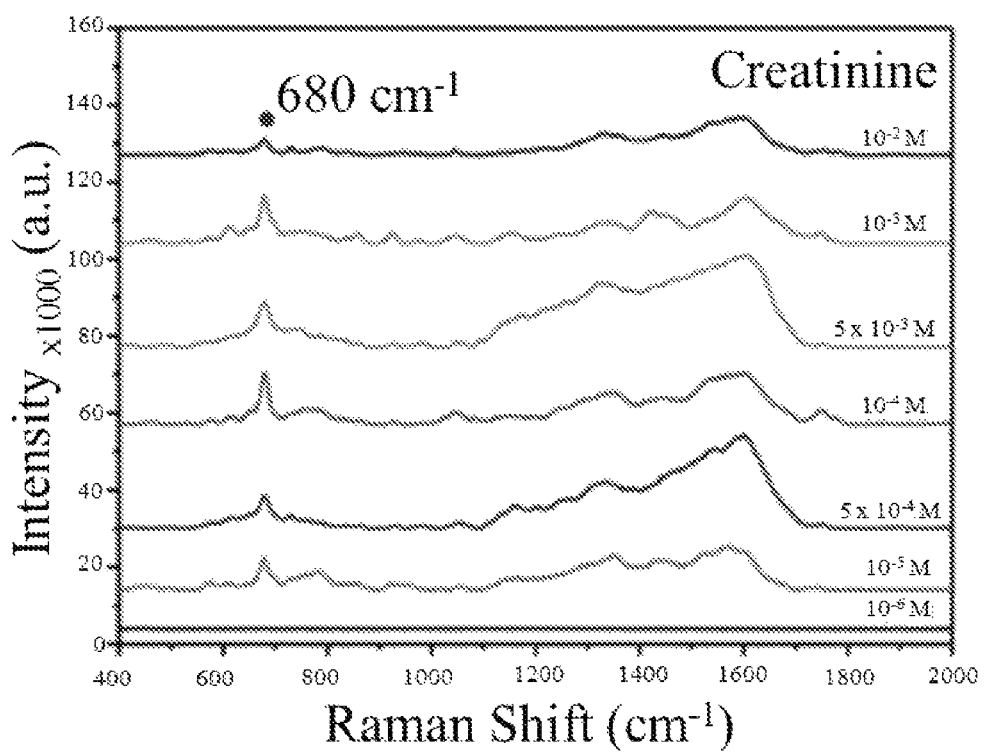
Figure 9C:
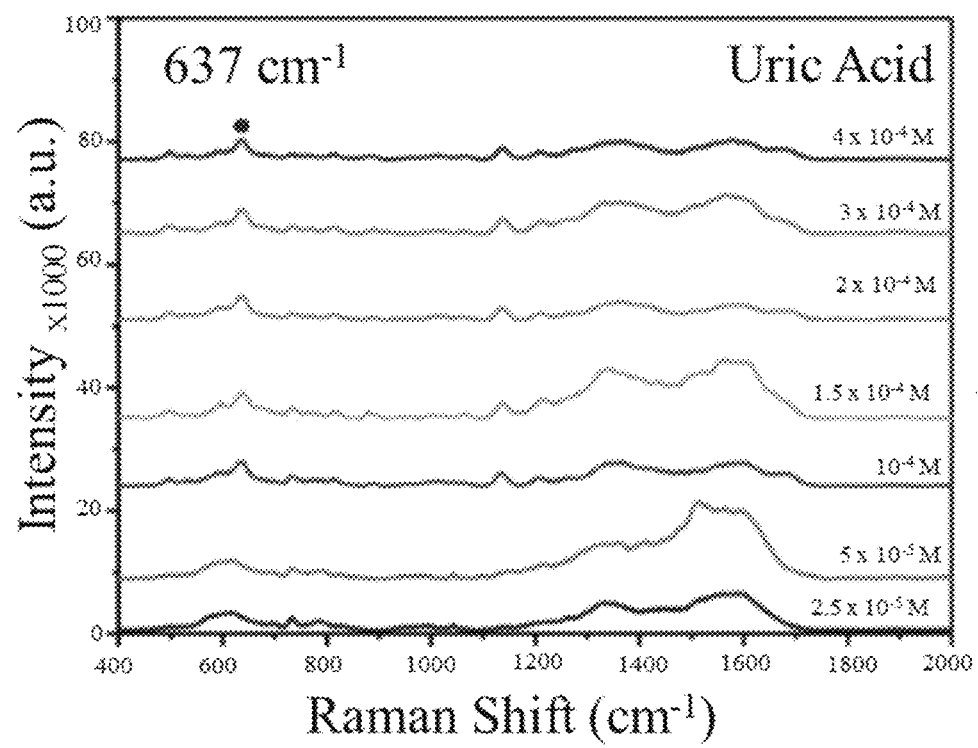
Figure 9D:
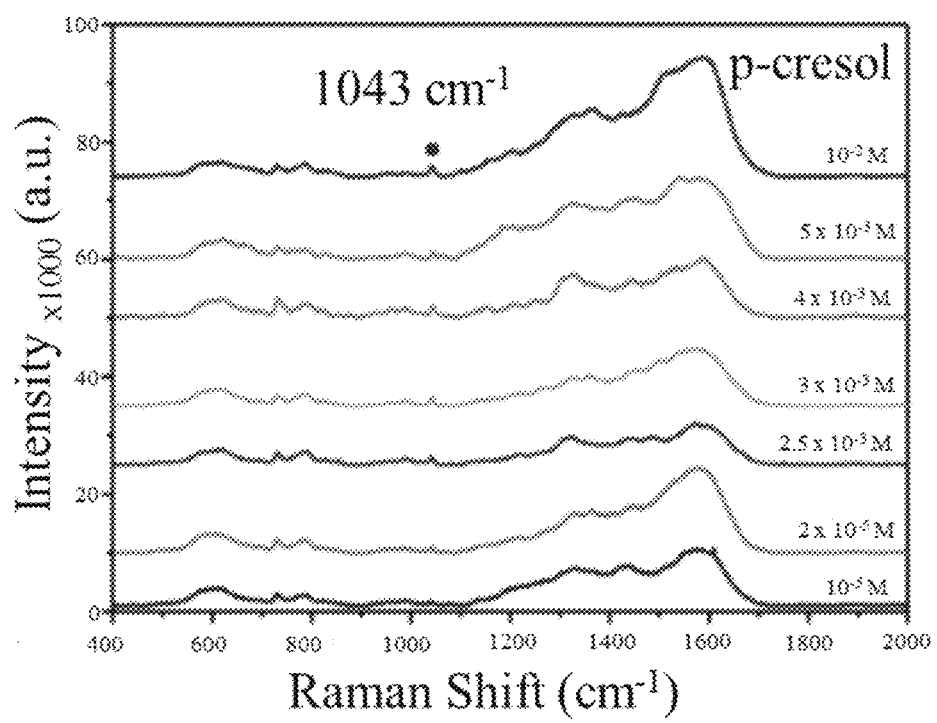

In FIG. 8A and FIG. 8B, common and variant-specific peaks are mostly unaffected for Alpha and Delta variants on Au NPs/fZrO$_2$. In FIG. 8C and FIG. 8D, for Alpha and Delta variants on Au NPs/pZrO$_2$, common and variant-specific peaks are also mostly unaffected. However, there are three specific SERS peaks, 1189 (i.e., for Alpha variant), 1100, and 1358 cm$^{-1}$ (i.e., for Delta variant) that are important to the study when one of the interfering substances is added.

By comparing FIG. 8A and FIG. 8C, the variant-specific peak 1189 cm$^{-1}$ is less affected by the addition of interfering substances when using Au NPs/fZrO$_2$, while for interfering substances (ii) Oxy and (iii) Flu, this peak may be affected when using Au NPs/pZrO$_2$. In FIG. 8C, an empty frame for the affected peak is marked. By comparing FIG. 8B and FIG. 8D, the variant-specific peaks 1100 and 1358 cm$^{-1}$ were unaffected when using Au NPs/fZrO$_2$, while the peak 1100 cm$^{-1}$ was affected by adding any of interfering substances and the peak 1358 cm$^{-1}$ was affected by adding (ii) Oxy or (iii) Flu when using Au NPs/pZrO$_2$. Empty frames for the affected peaks are also marked in FIG. 8D.

Testing Example 4—Analyte Sources: Toxicants

Four toxins, namely urea, creatinine, uric acid and p-cresol were used. Aqueous solutions of toxins at concentration ranges of $7.7 \times 10^{-2}$ to $10^{-5}$ M were prepared, and Au NPs/fZrO$_2$ was used.

FIG. 9A to FIG. 9D show the testing results of the present testing example. These results indicate that specific peaks 1001 cm$^{-1}$ in urea, 680 cm$^{-1}$ in creatinine, 637 cm$^{-1}$ in uric acid and 1043 cm$^{-1}$ in p-cresol can be measured. Thus, the Au NPs/fZrO$_2$ of the present invention is capable of detecting the toxins in a sample from a subjected to be diagnosed.

In addition, the metabolic wastes (for example, peptides/proteins and toxicants), such as beta 2 macroglobulin (β2-M) (11.8 kDa), uric acid, creatinine, urea and p-cresol, in the dialysis sample from the kidney dialysis patients were also detected. The dialysis sample was obtained from Nephrology Department of National Cheng Kung University Hospital, and the patient himself agreed to conduct clinical laboratory tests.

Figure 10:
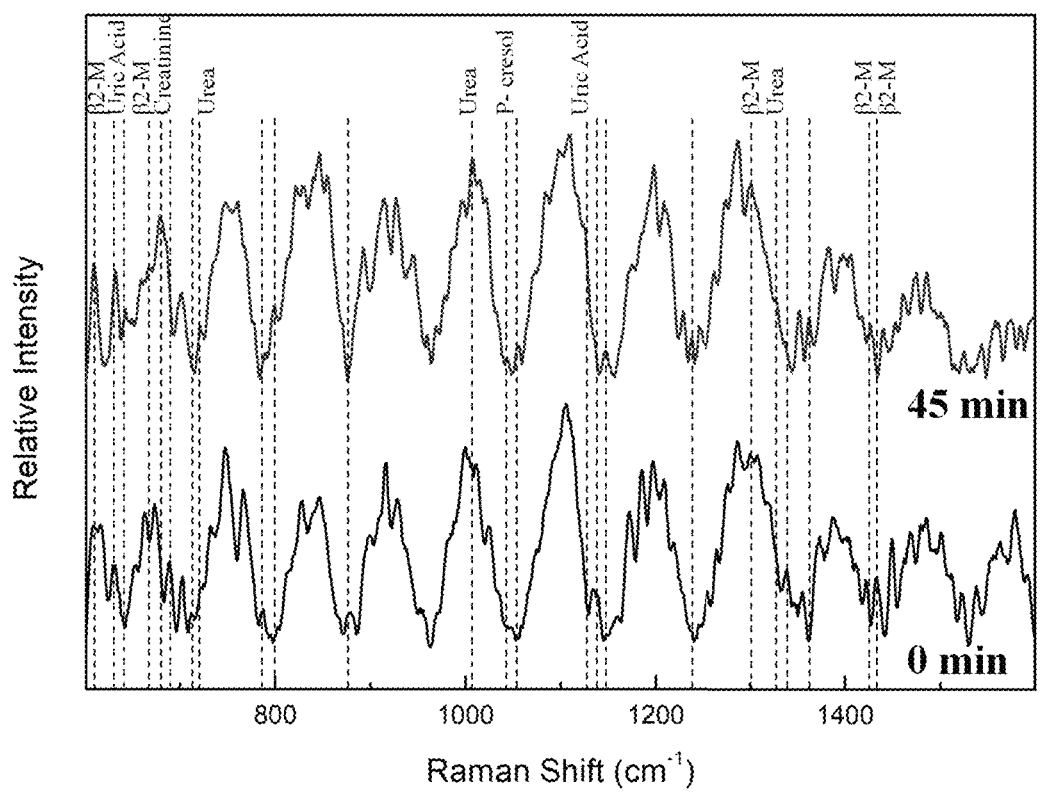
FIG. 10 shows the testing results of Testing example 4.

FIG. 10 show the testing results of the present testing example, wherein the characteristic peaks of toxicants in the dialysis sample from the kidney dialysis patients can be observed. It can be found that, there is a significant difference between the dialysis samples at the start of dialysis (as a reference standard) and 45 minutes after dialysis, as indicated by the black dotted line. This indicates that some molecular toxins are present in the dialysis sample after the dialysis process. The characteristic peaks of the five common medium or large molecular toxicants are as follows: 616, 660, 1300, 1421 and 1432 cm$^{-1}$ in β2-M; 637 cm$^{-1}$ in uric acid; 680 cm$^{-1}$ in creatinine; 725, 1001 and 1325 cm$^{-1}$ in urea; and 1043 cm$^{-1}$ in p-cresol. These results indicate that the Au NPs/fZrO$_2$ of the present invention can be used to identify the toxicants in the dialysis sample from the kidney dialysis patients.

Testing Example 5—Exosome

The characteristic peaks of the exosomes in L929 cells (normal cells) and B16-F10 cells (tumor cells) were measured in the present example.

The L929 (RM60091) and B16-F10 (60031) cell lines were obtained from the Bioresource Collection and Research Center (BCRC) in Hsinchu, Taiwan. Both cell lines were cultured in Dulbecco's Modified Eagle's Medium (DMEM) from Gibco, Thermo Fisher Scientific, USA. The growth medium was supplemented with 10% fetal bovine serum from Gibco, Thermo Fisher Scientific, USA, and 1% penicillin-streptomycin from HyClone 100X, Cytiva, Taiwan. The cells were incubated in a humidified incubator at 37° C. with 5% CO$_2$.

To perform the micro-plasma treatment, approximately $5 \times 10^4$ cells/mL of either L929 or B16-F10 cells were seeded in 24-well plates. The culture medium was then replaced with DMEM containing 1% penicillin-streptomycin. After medium replacement, the cells were treated with micro-plasma using either Ar gas or a mixture of Ar and 1% N$_2$ gas for 60 seconds. Following the micro-plasma treatment, the cells were incubated for an additional 24 hours.

Figure 11A:
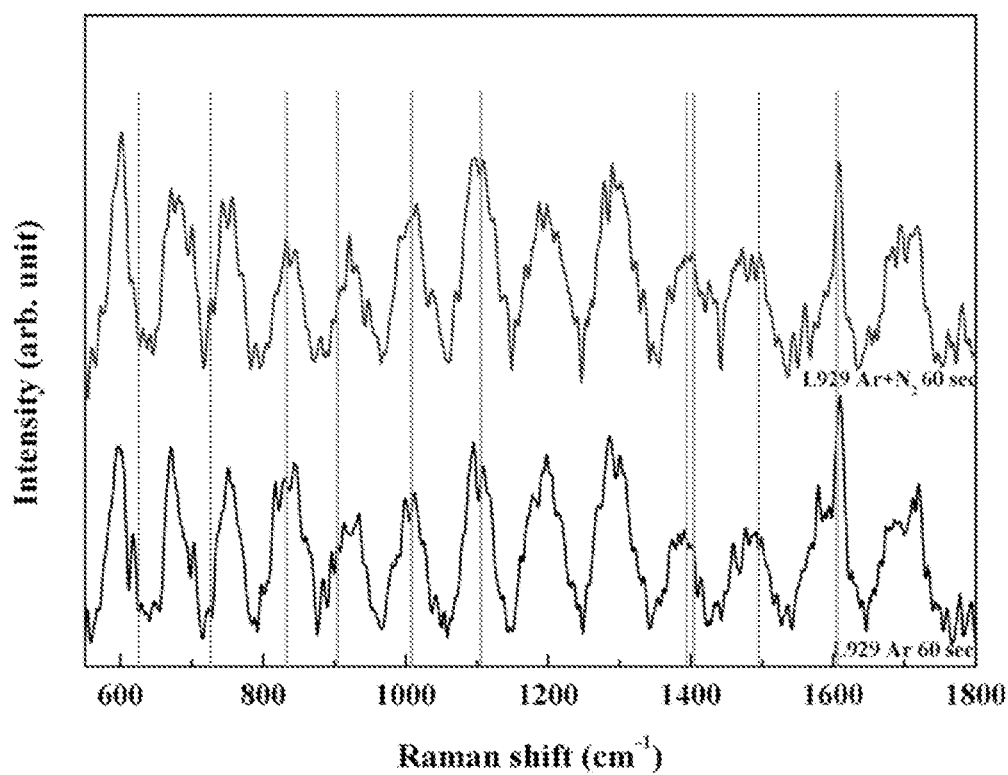
FIG. 11A and FIG. 11B show the testing results of Testing example 5.
Figure 11B:
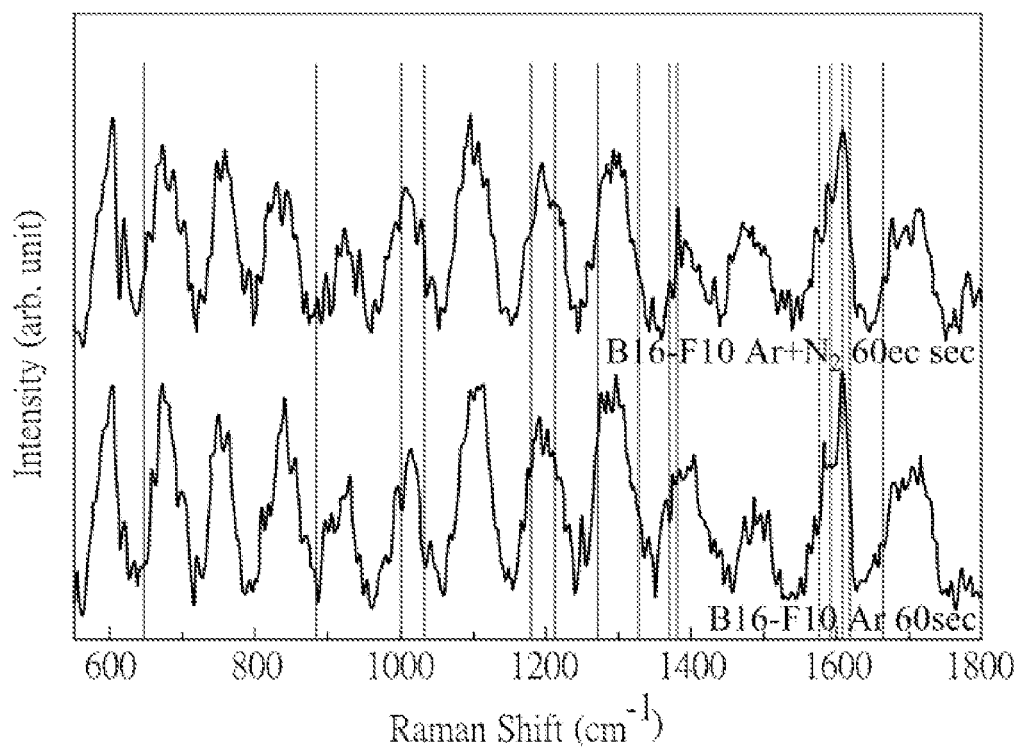

FIG. 11A and FIG. 11B show the testing results of the present testing example. As shown in FIG. 11A, the characteristic peaks of the exosome in the L929 cells can be observed. When the L929 cells were treated with micro-plasma using either Ar gas or a mixture of Ar and 1% N$_2$ gas for 60 seconds, characteristic peaks at 625, 726, 833, 904, 1008, 1106, 1394, 1404, 1495 and 1605 cm$^{-1}$ can be measured in the exosome sample in the L929 cells. As shown in FIG. 11B, the characteristic peaks of the exosome in the B16-F10 cells can be observed. When the B16-F10 cells were treated with micro-plasma using either Ar gas or a mixture of Ar and 1% N$_2$ gas for 60 seconds, characteristic peaks at 645, 883, 1000, 1032, 1179, 1211, 1271, 1326, 1328, 1370, 1381, 1576, 1592, 1608, 1618 and 1664 cm$^{-1}$ can be measured in the exosome sample in the B16-F10 cells. These results indicate that the Au NPs/fZrO$_2$ of the present invention can be used to identify the exosome in the normal cell or tumor cell.

To advance more active nanostructured substrates for applicating label-free SERS methods, a substrate Au NPs/fZrO$_2$, specially designed for virus particle detection was introduced and compared the previously developed substrate Au NPs/pZrO$_2$ accordingly. Key factors for the detection method include the SERS-active nanostructured substrate (factor 1), the appropriate Raman laser wavelength and power related to its sensing effect (factor 2), the size and dimensions of the analyte (factor 3), and the presence of interfering substance (factor 4). There are subsequent interactions that affect the SERS measurements. First, combining factors (1) and (2), the laser-induced SERS effect that occurs on the substrate is affected by hotspot generation (Interaction 1). Second, combining factors (1), (2), and (3), the target analyte within the effective hotspot(s) is affected by the distance between the analyte and the generated hotspot(s) (Interaction 2). Third, all factors considered, SERS spectra are also affected by the participation of interfering substances that often lead to a complex detection environment (Interaction 3).

Figure 1B:
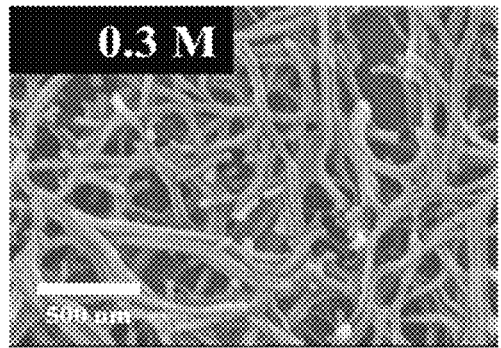
Figure 1C:
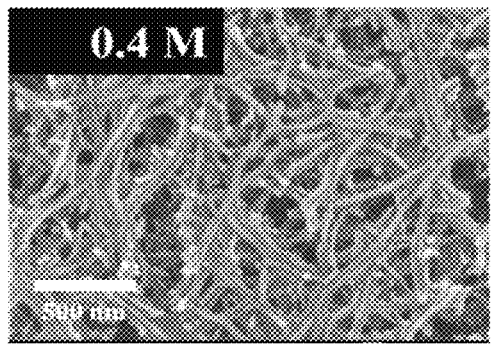
Figure 1D:
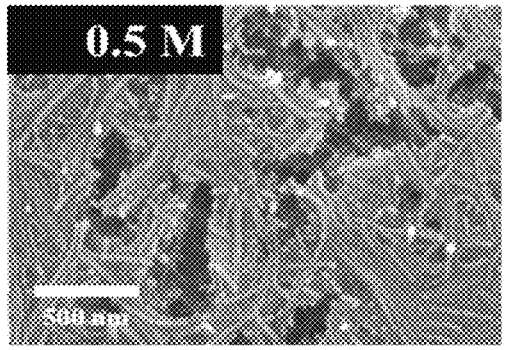

For Interaction 1, the reference substrate Au NPs/pZrO$_2$ contains arrayed nanobowl ZrO$_2$ structures and is coated with Au NPs to form many small hotspots inside the concave cavities (as shown in FIG. 1(b)). The substrate Au NPs/fZrO$_2$ provides Au NPs coverage on ZrO$_2$ multilayer nanofibers (as shown in FIG. 3). Au NPs/fZrO$_2$ is designed to first wet the test solution with the target analyte, improving detection efficiency by reducing unwanted molecules in the SERS signal. For small pesticide molecules, most of the solution and pesticide molecules are anticipated to pass through the controllable inter-fiber space of multilayer nanofibers.

For Interaction 2, a small fraction of e.g., target pesticide molecules shortens the distance from Au NPs and attaches to ZrO$_2$ multilayer nanofibers and Au NPs. When a Raman laser is applied, it can establish a balance between losing the amount of target analyte and access to the Au NPs hotspots.

It is feasible to enhance the intensity of the active SERS signal by optimizing the inter-fiber space of the nanofiber network structure, wetting and filtering solutions or interfering substances, and combining analytes with Au NPs and $ZrO_2$ multilayer nanofibers. In FIG. 5A to FIG. 5D, for the detection of small pesticide molecules, the detection performance of Au NPs/fZrO$_2$ is comparable to that of Au NPs/pZrO$_2$, indicating the applicability of the size and dimension of the analyte to the fibrous structure.

Au NPs/fZrO$_2$ clearly facilitated the detection of larger target molecules, such as virus particles. As illustrated, most of the small solution molecules can pass through the inter-fiber space of Au NPs/fZrO$_2$. Importantly, live SARS-Co-2 virus is a large target analyte, and most of them tend to attach to Au NPs and ZrO$_2$ multilayer nanofibers, thereby shortening the distance to Au NPs hotspots. Owing to the combination of this effect and the filtered solution, the detection efficiency can be significantly improved. In FIG. 6A to FIG. 6D, due to the influence of the substrates on the analytes, this may originate from differences in their interaction surfaces and lead to the formation of different hotspots, affecting their ability to enhance spectral intensity. Au NPs/fZrO$_2$ showed relatively stronger peak intensities in the detection of Alpha and Delta variants and provided more unique SERS peaks, which are most likely related to differences in substrate morphology and differences between analytes and Au NPs hotspots. In other words, these differences depend on the laser-induced Raman hotspot(s) and the effective distance between the analyte and Au NPs hotspot(s). Nonetheless, as shown in FIG. 7A to FIG. 7D, the LODs for the detection of Alpha and Delta variants using Au NPs/fZrO$_2$ and Au NPs/pZrO$_2$ were comparable, revealing the trace detection capability of both substrates when the analyte is falls in the hotspot region.

For Interaction 3, SERS spectra are also affected by the addition of interfering substance. In FIG. 8A to FIG. 8D, the effect of three interfering substances on the detection of Alpha and Delta variants was investigated by indicating ten common peaks and variant-specific peaks for Alpha and Delta variants at the LOD level. By taking three specific SERS peaks, 1189 cm$^{-1}$ for Alpha variant, 1100 and 1358 cm$^{-1}$ for Delta variant, it was shown that Au NPs/fZrO$_2$ was unaffected by the addition of any interfering substance. However, Au NPs/pZrO$_2$ was significantly affected by two interfering substances. It is thus clear that the multilayer fibrous structure of Au NPs/fZrO$_2$ achieves very high virus particle detection efficiency, as well as the discrimination of Alpha and Delta variants.

The development of a nanostructured substrate Au NPs/fZrO$_2$ provides an efficient approach for label-free detection of virus particles. The performance of the substrate is attributed to the optimization of four key factors, including the SERS-active nanostructured substrate, the appropriate Raman laser wavelength and power related to its sensing effect, the size and dimensions of the analyte, and the presence of interfering substance. Subsequent interactions between/among these factors affect the result of SERS measurements. Compared with Au NPs/pZrO$_2$, Au NPs/fZrO$_2$ improves detection efficiency by reducing unwanted molecules in the SERS signal. The multilayer fibrous structure of Au NPs/fZrO$_2$ enables the detection of large target molecules, such as live SARS-CoV-2 virus; by filtering out solution molecules and shortening the effective distance of virus particles from Au NPs hotspot(s) and ZrO$_2$ multilayer nanofibers, the detection efficiency is significantly improved. In addition, Au NPs/fZrO$_2$ shows relatively stronger peak intensities and provides more unique SERS peaks, which are most likely related to the differences in substrate morphology and differences between analytes and Au NPs. The trace detection capabilities of both substrates were comparable at the concentration of the LOD level for Alpha and Delta variants. The multilayered fibrous structure of Au NPs/fZrO$_2$ enables efficient detection of virus particle and discrimination between Alpha and Delta variants. Therefore, these findings hold great promise for the development of label-free SERS-based biosensors for the trace detection of virus particles or other large molecules (such as proteins).

Although the present invention has been explained in relation to its embodiment, it is to be understood that many other possible modifications and variations can be made without departing from the spirit and scope of the invention as hereinafter claimed.

The invention claimed is:

1. A method for detecting an analyte, comprising the following steps: providing a SERS-active substrate and a Raman spectra database, wherein the SERS-active substrate comprises: a support; a first dielectric layer disposed on the support, wherein the first dielectric layer is formed by a plurality of first nanofibers; and a plurality of noble metal particles formed on the plurality of first nanofibers; applying a sample onto the SERS-active substrate; applying an incident light by a Raman spectrometer onto the SERS-active substrate to generate a Raman spectrum of the sample; and comparing the Raman spectrum of the sample with a Raman spectra database to identify an analyte in the sample and wherein the plurality of first nanofibers form a plurality of first grids, and the plurality of first grids respectively have a hole size ranging from 250 nm to 1200 nm.

2. The method of claim 1, wherein 40% to 70% of a surface of the support is covered by the plurality of first nanofibers.

3. The method of claim 1, wherein a thickness of the first dielectric layer ranges from 20 nm to 100 nm.

4. The method of claim 1, wherein the SERS-active substrate further comprises a second dielectric layer disposed on the first dielectric layer, and the second dielectric layer is formed by a plurality of second nanofibers.

5. The method of claim 4, wherein the plurality of second nanofibers form a plurality of second grids, and a hole size of one of the plurality of second grids is less than a hole size of one of the plurality of first grids.

6. The method of claim 5, wherein the plurality of second grids respectively have a hole size ranging from 100 nm to 500 nm.

7. The method of claim 4, wherein 70% to 90% of a surface of the support is covered by the plurality of second nanofibers.

8. The method of claim 4, wherein the plurality of noble metal particles are further formed on the plurality of second nanofibers.

9. The method of claim 4, wherein a sum of a thickness of the first dielectric layer and a thickness of the second dielectric layer ranges from 50 nm to 150 nm.

10. The method of claim 1, wherein a metal of the plurality of noble metal particles is Au, Ag or an alloy thereof.

11. The method of claim 10, wherein the metal of the plurality of noble metal particles is Au.

12. The method of claim 1, wherein the plurality of noble metal particles respectively have a diameter ranging from 0.5 nm to 50 nm.

13. The method of claim 12, wherein the plurality of noble metal particles respectively have the diameter ranging from 20 nm to 40 nm.

14. The method of claim 1, wherein the plurality of first nanofibers comprises a ceramic material with dielectric constant ranging from 3.9 to 30.

15. The method of claim 14, wherein the ceramic material is $ZrO_2$, $HfO_2$, $Al_2O_3$ or a combination thereof.

16. The method of claim 4, wherein the plurality of second nanofibers comprises a ceramic material with dielectric constant ranging from 3.9 to 30.

17. The method of claim 16, wherein the ceramic material is $ZrO_2$, $HfO_2$, $Al_2O_3$ or a combination thereof.

* * * * *